(12) United States Patent
Rezvani et al.

(10) Patent No.: US 6,937,616 B1
(45) Date of Patent: Aug. 30, 2005

(54) METHOD AND APPARATUS FOR PROVIDING PACKET BASED AND DISTRIBUTED XDSL COMMUNICATIONS

(75) Inventors: Behrooz Rezvani, Pleasanton, CA (US); Sam Heidari, Fremont, CA (US); Avadhani Shridhar, Santa Clara, CA (US); Omprakash S. Samaru, Fremont, CA (US); Firooz Massoudi, Santa Clara, CA (US)

(73) Assignee: Velocity Communication, Inc., Fremont, CA (US)

( * ) Notice: Subject to any disclaimer, the term of this patent is extended or adjusted under 35 U.S.C. 154(b) by 833 days.

(21) Appl. No.: 09/620,779

(22) Filed: Jul. 21, 2000

Related U.S. Application Data

(60) Provisional application No. 60/145,074, filed on Jul. 21, 1999.

(51) Int. Cl.$^7$ .............................................. H04J 3/22
(52) U.S. Cl. ................. 370/466; 370/271; 370/352; 370/422; 370/423; 370/434; 370/435; 370/480; 370/490; 370/493; 370/495; 379/49; 379/87; 379/88.07; 379/88.13; 379/92.02; 379/92.03; 379/93.01; 379/93.09
(58) Field of Search ............................... 370/422, 423, 370/434, 435, 466, 480, 490, 493–495, 271, 370/352; 379/49, 88.07, 88.13, 87, 92.02, 379/92.03, 93.01, 93.09

(56) References Cited

U.S. PATENT DOCUMENTS

| | | | |
|---|---|---|---|
| 4,637,035 A | 1/1987 | Betts | |
| 5,668,857 A | 9/1997 | McHale | |
| 5,793,803 A | 8/1998 | Barnes | |
| 6,021,158 A | 2/2000 | Schurr et al. | |
| 6,084,885 A | 7/2000 | Scott | |
| 6,088,430 A * | 7/2000 | McHale | 379/93.28 |
| 6,226,322 B1 * | 5/2001 | Mukherjee | 375/229 |
| 6,281,829 B1 * | 8/2001 | Amrany et al. | 341/155 |
| 6,345,072 B1 * | 2/2002 | Liu et al. | 375/222 |
| 6,351,487 B1 * | 2/2002 | Lu et al. | 375/225 |
| 6,421,796 B1 * | 7/2002 | Gatherer | 714/702 |
| 6,580,785 B2 * | 6/2003 | Bremer et al. | 379/88.13 |
| 2002/0061061 A1 * | 5/2002 | Young et al. | |
| 2002/0080869 A1 * | 6/2002 | Young et al. | |

* cited by examiner

Primary Examiner—Wellington Chin
Assistant Examiner—Kevin Mew
(74) Attorney, Agent, or Firm—IP Creators; Charles C Cary

(57) ABSTRACT

A method and apparatus for digital subscriber line (xDSL) communications between one or more digital signal processors (DSPs) and analog front ends (AFEs) each coupled to corresponding subscriber line(s). The apparatus transports channels of data between subscribers and the DSP(s). The apparatus includes a bus for the transport of digital data, a DSP AFE interfaces. The DSP interfaces couples the DSP to the bus. The DSP interface accepts downstream channels of digital data from the DSP and transmits packets each associated with a corresponding one of the downstream channels to the bus. Each of the packets identifies a targeted AFEs coupled to a selected one of the subscriber lines. The AFE interfaces each couple an associated one of the AFEs to the bus. Each of the AFE interfaces transmits selected packets to a selected one of the subscriber lines for the transport to the subscriber.

7 Claims, 20 Drawing Sheets

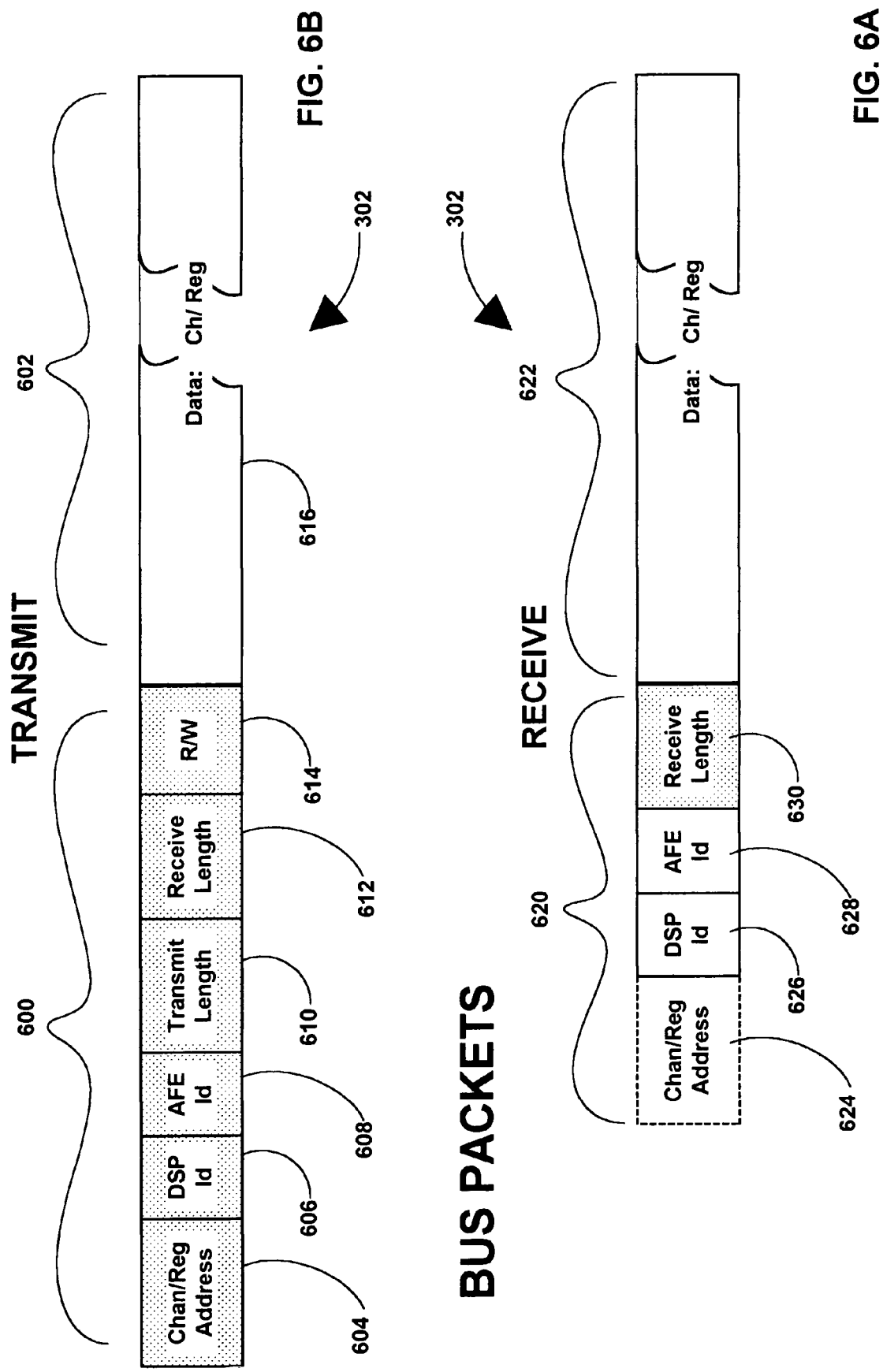

Component Parameters TRANSMIT

DSP

| | G.LITE | ADSL | VDSL | Other |
|---|---|---|---|---|
| Sample space | 256 | 512 | 512, 1024, 2048, 4096 | |
| # Tones | 128 | 256 | 256, 512, 1024, 2048 | |
| Cyclic Prefix | 16 | 32 | Programmable | •• |
| Switching | High Pass Filter | High Pass Filter | None | |

FIG. 10A

AFE

| | G.LITE | ADSL | VDSL | Other |
|---|---|---|---|---|
| Interpolator | 8x | 8x | 4x | |
| Digital Filter | 552 kHz | 1.104 MHz | 3.75 MHz, 8.5MHz | |
| Noise Shaping | | | | •• |
| DAC | 8 Channels | 8 Channels | 1 Channel | |
| Amp | 17.4 dbm | 20.4 dbm | 11.5 dbm | |
| Switching | | | | •• |

FIG. 10B

Component Parameters
RECEIVE

DSP

| | G.LITE | ADSL | VDSL | Other |
|---|---|---|---|---|
| Sample space | 64 | 64 | 512, 1024, 2048, 4096 | |
| # Tones | 32 | 32 | 256, 512, 1024, 2048 | |
| Cyclic Prefix | 4 | 4 | Programmable | |
| | •• | •• | •• | •• |
| Switching | •• | | | |

FIG. 10C

AFE

| | G.LITE | ADSL | VDSL | Other |
|---|---|---|---|---|
| Amp Gain Ctrl | | | | |
| Analog Filter | 138 kHz | 138 kHz | 5.2 MHz, 12.0 MHz | |
| ADC | 64x 1bit SigmaDelta | 64x 1bit SigmaDelta | 2 x 11 bit Linear | |
| Decimator | 8 Channels | 8 Channels | 1 Channel | |
| | •• | •• | •• | •• |
| Switching | •• | | | |

FIG. 10D

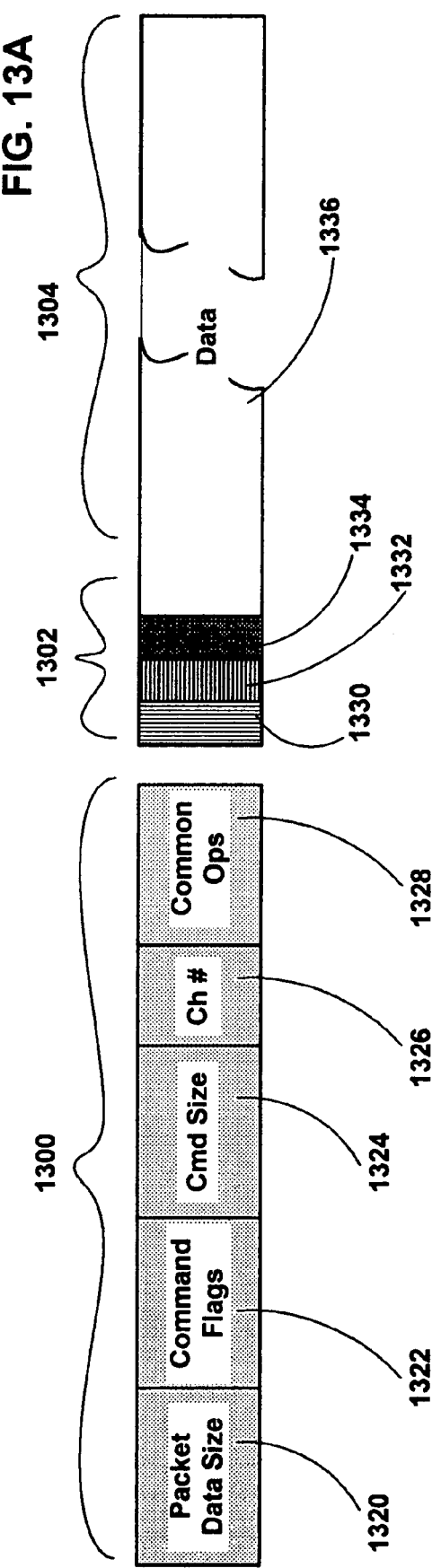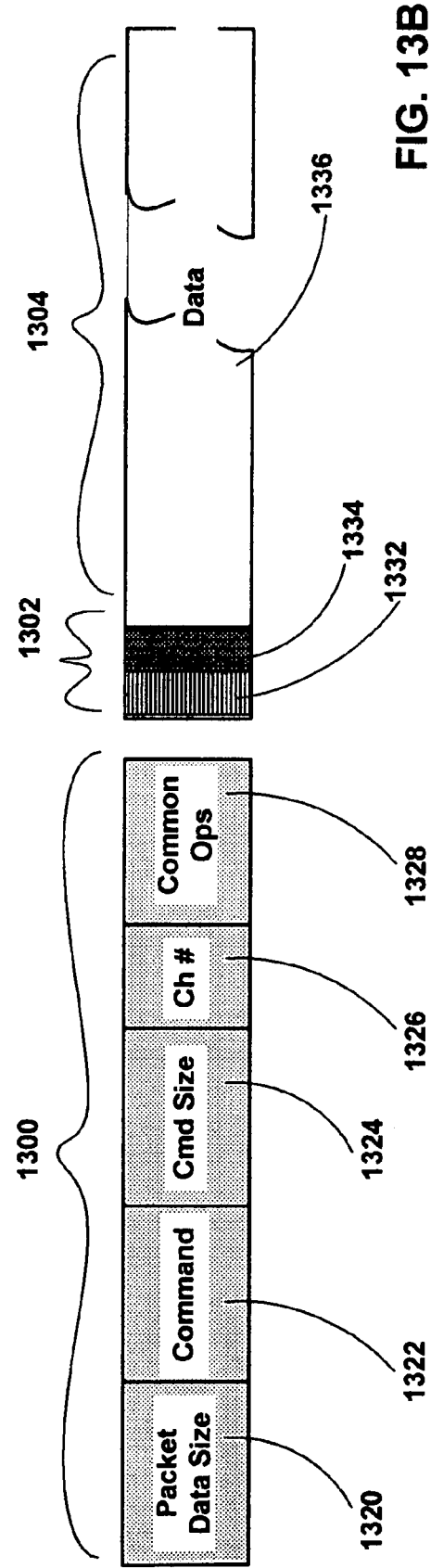
DSP PACKETS

METHOD AND APPARATUS FOR PROVIDING PACKET BASED AND DISTRIBUTED XDSL COMMUNICATIONS

CROSS REFERENCE TO RELATED APPLICATION

This application claims the benefit of prior filed co-pending Provisional Application No. 60/145,074 entitled "UNIVERSAL x-DSL ARCHITECTURE" and filed on Jul. 21, 1999. The above-cited applications is incorporated herein by reference in its entirety.

BACKGROUND OF THE INVENTION

1. Field of Invention

This invention relates generally to communications, and more particularly, to a method and apparatus for providing digital subscriber line (xDSL) communications between analog front ends (AFEs) and one or more digital signal processors (DSPs).

2. Description of the Related Art

North American Integrated Service Digital Network (ISDN) Standard, defined by the American National Standard Institute (ANSI), regulates the protocol of information transmissions over telephone lines. In particular, the ISDN standard regulates the rate at which information can be transmitted and in what format. ISDN allows full duplex digital transmission of two 64 kilo bit per second data channels. These data rates may easily be achieved over the trunk lines, which connect the telephone companies' central offices. The problem lies in passing these signals across the subscriber line between the central office and the business or residential user. These lines were originally constructed to handle voice traffic in the narrow band between 300 Hz to 3000 Hz at bandwidths equivalent to several kilo baud.

Digital Subscriber Lines (DSL) technology and improvements thereon including: G.Lite, ADSL, VDSL, HDSL all of which are broadly identified as xDSL have been developed to increase the effective bandwidth of existing subscriber line connections, without requiring the installation of new fiber optic cable. An xDSL modem operates at frequencies higher than the voiceband frequencies, thus an xDSL modem may operate simultaneously with a voiceband modem or a telephone conversation.

Currently there are over ten discrete xDSL standards, including: G.Lite, ADSL, VDSL, SDSL, MDSL, RADSL, HDSL, etc. Within each standard there are at least two possible line codes, or modulation protocols, discrete multi-tone (DMT) and carrierless AM/PM (CAP). A typical DMT system utilizes a transmitter inverse fast Fourier transform (IFFT) and a receiver fast Fourier transform (FFT). The following patents are related to DMT modems: U.S. Pat. No. 5,400,322 relates to bit allocation in the multicarrier channels; U.S. Pat. No. 5,479,447 relates to bandwidth optimization; U.S. Pat. No. 5,317,596 relates to echo cancellation; and U.S. Pat. No. 5,285,474 relates to equalizers. The following patents are related to CAP modems: U.S. Pat. No. 4,944,492 relates to multidimensional passband transmission; U.S. Pat. No. 4,682,358 relates to echo cancellation; and U.S. Pat. No. 5,052,000 relates to equalizers. Each of these patents is incorporated by reference as if fully set forth herein.

XDSL modems are typically installed in pairs, with one of the modems installed in a home and the other in the telephone companies central office (CO) switching office servicing that home. This provides a direct dedicated connection to the home from a line card at the central office on which the modem is implemented through the subscriber line or local loop.

Modems using CAP or DMT or other line codes, essentially have three hardware sections:
(a) an analog front end (AFE) to convert the analog signals on the subscriber line into digital signals and convert digital signals for transmission on the subscriber line into analog signals,
(b) digital signal processing (DSP) circuitry to convert the digital signals into an information bitstream and optionally provide error correction, echo cancellation, and line equalization, and
(c) a host interface between the information bitstream and its source/destination. Typically all of these components are located on a highly integrated single line card with a dedicated connection between one or more AFE's and a DSP.

Each installation represents a sizeable expense in hardware and service labor to provision the central office. The expense may not always be amortized over a sufficient period of time due the relentless introduction of new and faster xDSL standards each of which pushes the performance boundaries of the subscriber line in the direction of increasing bandwidth and signal integrity. As each new standard involves, line cards must typically be replaced to upgrade the service.

What is needed is a less rigid signal processing architecture that supports scalability of CO resources, and allows a more flexible hardware response to the evolving xDSL standards and the problems associated with providing hardware to handle each new standard.

SUMMARY OF THE INVENTION

The present invention advantageously provides a method and apparatus for providing digital subscriber line (xDSL) communications between analog front ends (AFEs) and one or more digital signal processors (DSPs), such that, any xDSL protocol can be supported either locally or in a distributed fashion.

The present invention provides a signal processing architecture that supports scalability of CO resources, and allows a more flexible hardware response to the evolving xDSL standards and the problems associated with providing hardware to handle each new standard.

In an embodiment of the invention an apparatus and associated method for a packet based system operable to process subscriber line communications effectuable between at least one digital signal processor (DSP) and a plurality of analog front ends (AFEs) each coupled to at least one corresponding subscriber line is disclosed. The apparatus allows the transport of a corresponding channel of data between a subscriber coupled to a corresponding subscriber line and the DSP. The apparatus includes a bus for the transport of digital sampled data, a DSP I/O interface and a plurality of AFE I/O interfaces. The DSP I/O interfaces couples the DSP to said bus. The DSP I/O interface for accepting a plurality of downstream channels of digital data from the DSP and for transmitting packets each associated with a portion of a corresponding one of said downstream channels to said bus. Each of said packets includes indicia of a targeted one among the AFEs coupled to a selected one of the subscriber lines for the transport of said packet to the subscriber. The plurality of AFE I/O interfaces each couple an associated one of the plurality of AFEs to said bus. Each of said plurality of AFE I/O interfaces for transmitting selected ones among said packets in which the indicia corresponds to that of the associated one of the plurality of AFEs to the selected one of the subscriber lines for the transport of said packet to the subscriber.

BRIEF DESCRIPTION OF THE DRAWINGS

These and other features and advantages of the present invention will become more apparent to those skilled in the art from the following detailed description in conjunction with the appended drawings in which:

FIGS. 6A–B are detailed structural views of the receive and transmit packets respectively for transport of data on the system bus shown in FIG. 5.

FIGS. 8A–B are process flow diagrams showing a portion of the processes executed by the DSP and AFE I/O interfaces respectively for the transport of data across the bus shown in FIG. 5.

FIGS. 10A–D are tables listing distinct configuration parameters for several xDSL subscriber line standards, i.e. G.Lite, ADSL and VDSL.

FIGS. 13A–B are detailed structural views of the device packets utilized in the DSP for the transport of data between various submodules of the DSP shown in FIG. 4.

DETAILED DESCRIPTION OF THE EMBODIMENTS

The present invention advantageously enables a method and apparatus for providing digital subscriber line (xDSL) communications between analog front ends (AFEs) and one or more digital signal processors (DSPs).

The present invention provides a signal processing architecture that supports scalability of CO/DLC/ONU resources, and allows a significantly more flexible hardware response to the evolving xDSL standards without overcommitting of hardware resources. As standards evolve hardware may be reconfigured to support the new standards.

In the following FIGS. 1–16 the one-hundred series reference numbers, i.e. reference numbers between 100–199, refer to elements introduced in FIG. 1 and the accompanying portion of the Specification, the two-hundred series reference numbers refer to elements introduced in FIG. 2, and so forth up to and including the sixteen-hundred series reference numbers which refer to elements introduced in FIG. 16.

Figure 1:
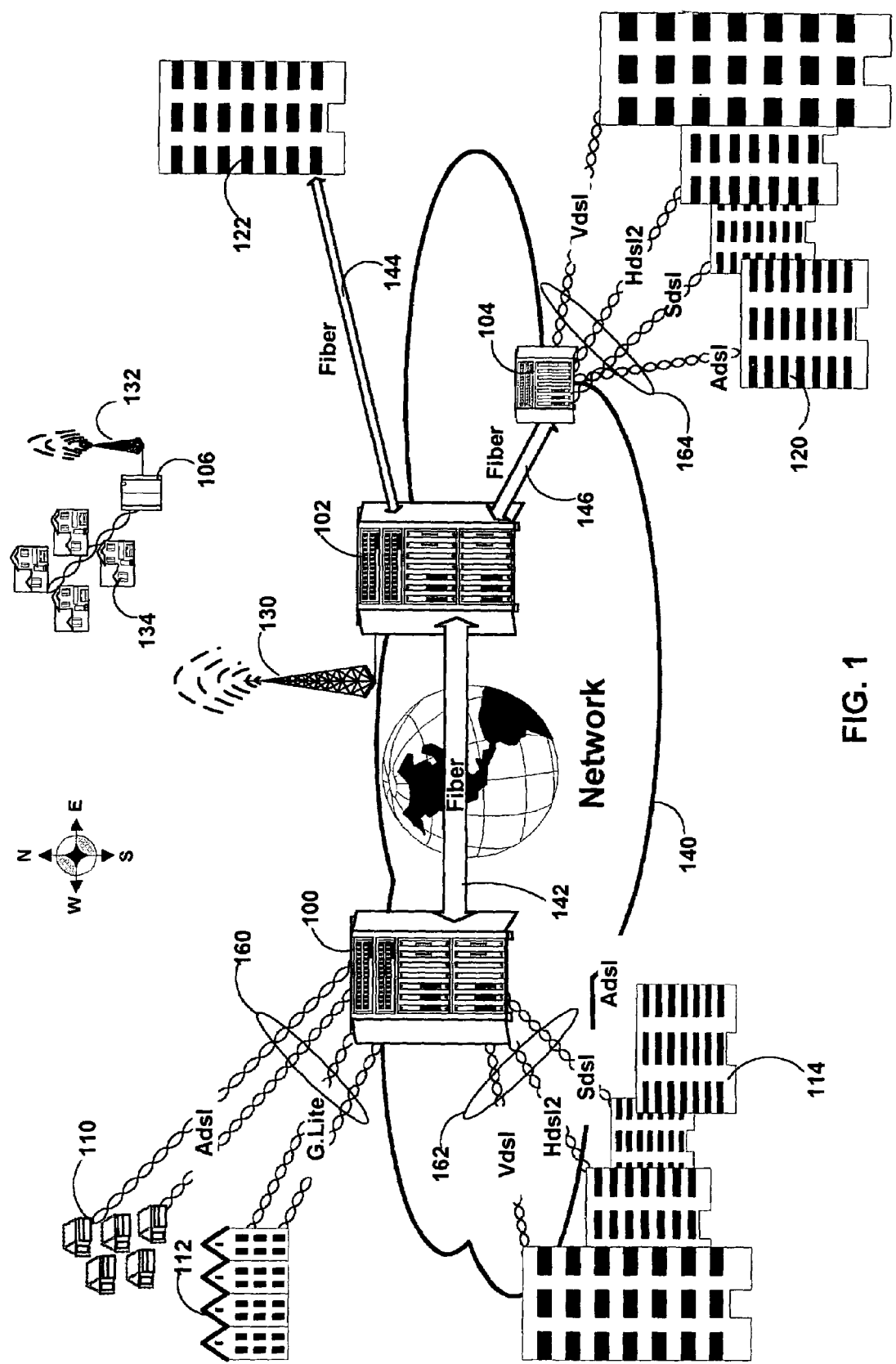
FIG. 1 depicts an overall system environment in which individual subscribers are coupled across public service telephone network (PSTN) subscriber lines with one or more high speed networks.

FIG. 1 depicts an overall system environment in which individual subscribers are coupled across public service telephone network (PSTN) subscriber lines with one or more high speed networks. Telco COs 100, 102, 106 and remote access terminal 104 are shown coupling various subscribers to one another and to a high speed network 140. The high speed network 140 provides fiber optic links between the central office and remote access terminal. CO's 100–102 are coupled to one another via fiber optic link 142. CO 102 couples to remote access terminal 104 via fiber optic link 146. CO also couples to subscriber site 122 via fiber optic link 144. CO 102 and CO 106 couple to one another via a wireless link provided by corresponding wireless transceivers 130 and 132 respectively. The "last mile" connecting each subscriber, (except subscriber 122) is provided by twisted copper PSTN telephone lines. On these subscriber lines voice band and data communication are provided. The data communication is shown as various xDSL protocols including G.Lite, ADSL VDSL, and HDSL2. CO 100 is coupled via G.Lite and ADSL modulated subscriber line connections 160 with subscribers 110 and 112. CO 100 is also coupled via G.Lite and ADSL modulated subscriber line connections 162 with subscriber 114. CO 106 is also coupled via a subscriber line to subscriber 134. Remote access terminal is coupled via subscriber line connections 164 with subscribers 120. In each case the corresponding CO may advantageously be provided with distributed AFE and DSP resources for handling multiple protocols from multiple locations with the added benefit of load balancing, and statistical multiplexing. The apparatus and method of the current invention is suitable for handling communications on any of these subscriber lines.

Figure 2:
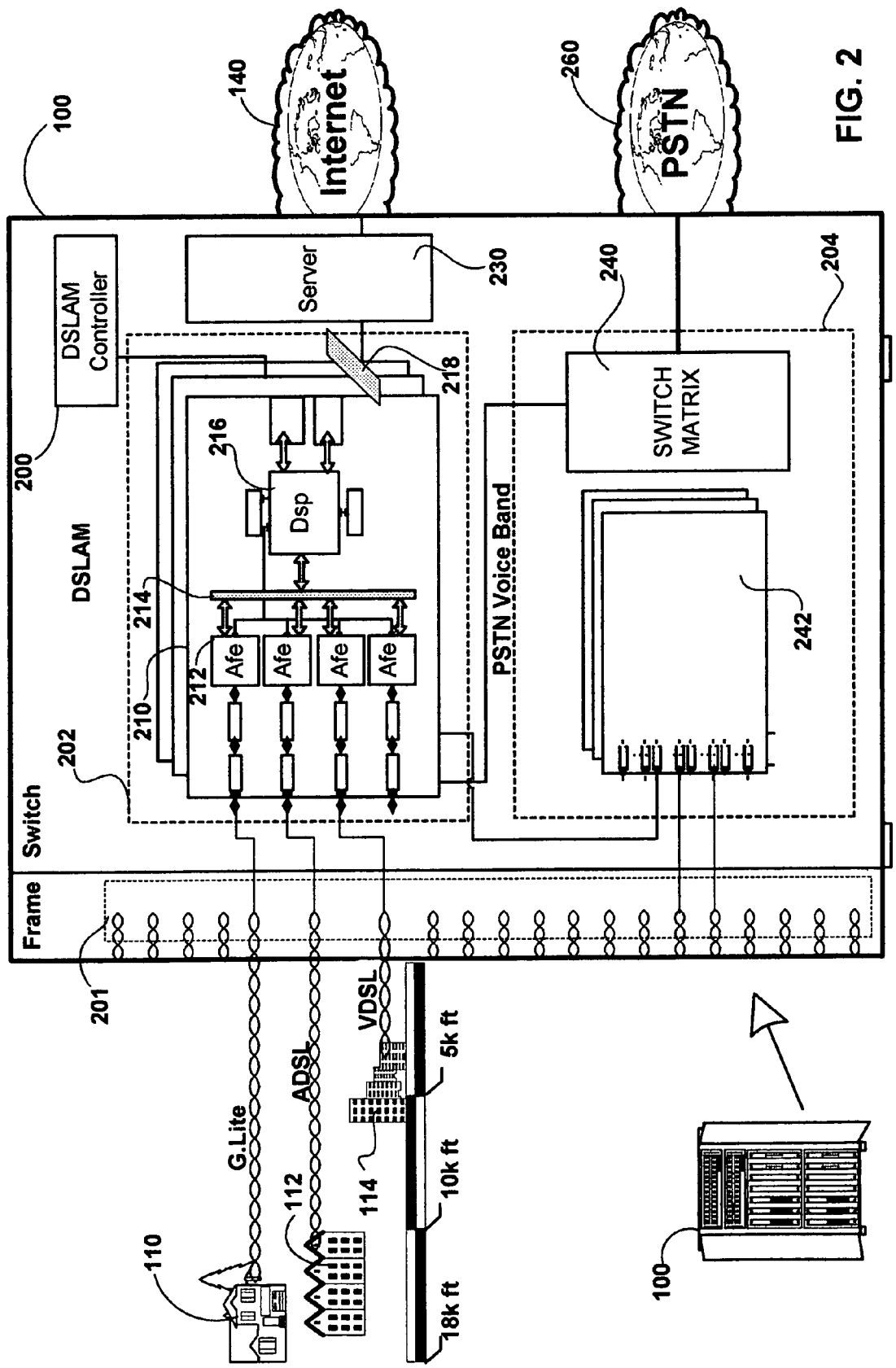
FIG. 2 depicts a more detailed view of a representative one of the central offices shown in FIG. 1 including both digital subscriber line access modules (DSLAMs) and PSTN voice band modules.

In an alternate embodiment of the invention communications are also provided between DSP resources at one site, e.g. CO 100 and AFE resources at a separate site, e.g. CO FIG. 2 depicts a more detailed view of a representative one of the central offices shown in FIG. 1 including both digital subscriber line access modules (DSLAMs) and PSTN voice band modules. The CO 100 includes subscriber line connections to subscribers 110–114. Each of these connections terminates in the frame room 201 of the CO. From this room connections are made for each subscriber line via splitters and hybrids to both a DSLAM 202 and to the voice band racks 204. The splitter shunts voice band communications to dedicated line cards, e.g. line card 242 or to a voice band modem pool (not shown). The splitter shunts higher frequency xDSL communications on the subscriber line to a selected line card 210 within DSLAM 202. The line cards of the current invention are universal, meaning they can handle any current or evolving standard of xDSL and may be upgraded on the fly to handle new standards.

Voice band call set up is controlled by a Telco switch matrix 240 such as SS7 coupled to the PSTN 260. This switch matrix makes point-to-point connections to other subscribers for voice band communications. The xDSL communications may be processed by a universal line card such as line card 212. That line card includes a plurality of AFEs 212 each capable of supporting a plurality of subscriber lines. The AFEs are coupled via a proprietary packet based bus 214 to a DSP 216 which is also capable of multi-protocol support for all subscriber lines to which the AFEs are coupled. The line card itself is coupled to a back-plane bus 218 which may in an embodiment of the invention be capable of offloading and transporting low latency xDSL traffic between other DSPs for load balancing. Communications between AFEs and DSP(s) are packet based which allows a distributed architecture such as will be set forth in the following FIG. 3 to be implemented. Each of the DSLAM line cards operates under the control of a DSLAM controller 200 which handles global provisioning, e.g. allocation of subscriber lines to AFE and DSP resources. Once a xDSL connection is established between the subscriber and a selected one of the DSLAM submodules, e.g. AFE and DSP the subscriber will be able to access any network to which the DSLAM is connected. In the example shown the DSLAM couples via server 230 with Internet 140.

Figure 3:
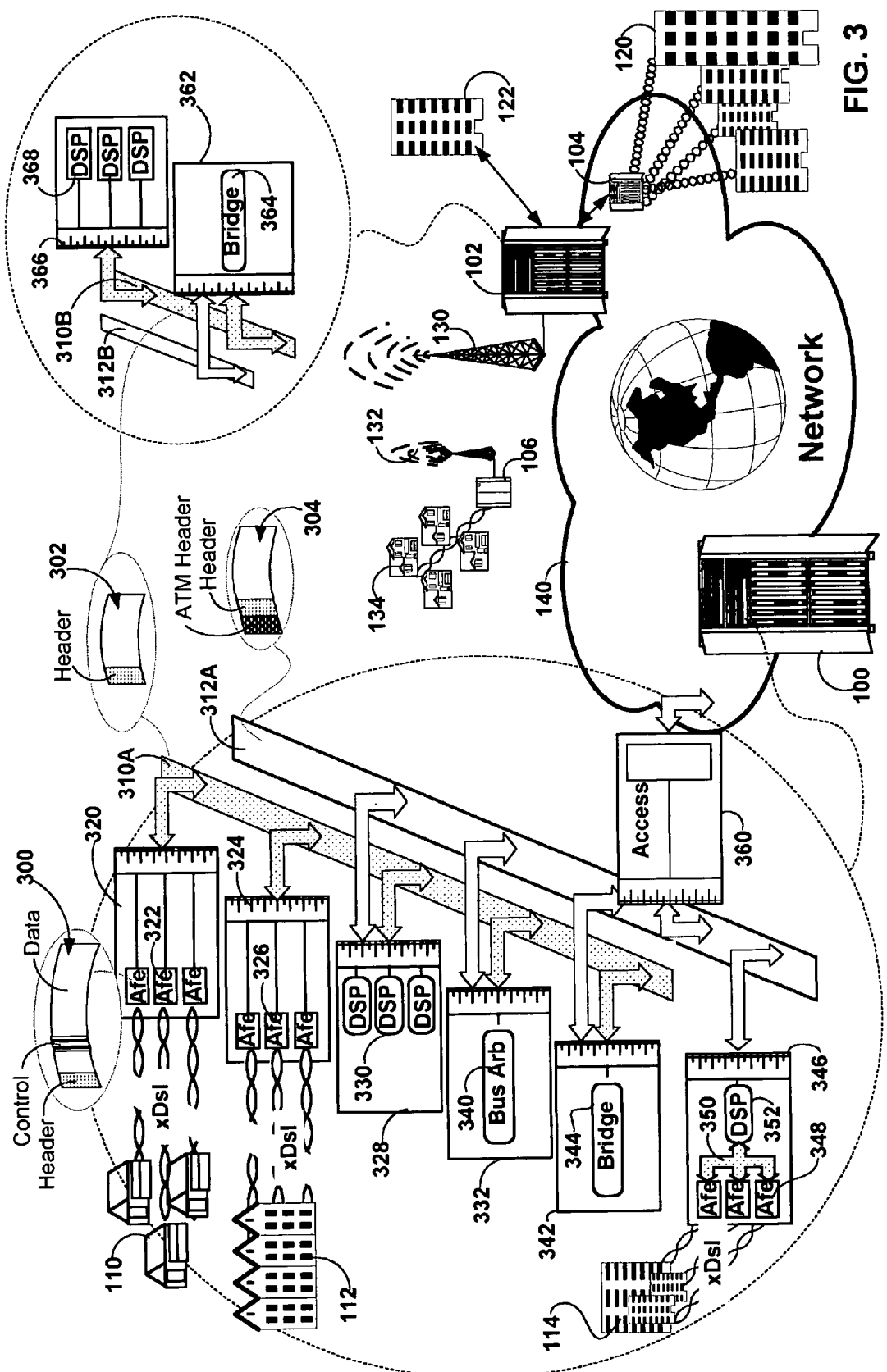
FIG. 3 shows a more detailed view of various architectural variations of DSLAM modules shown in FIG. 2 which are enabled by the current invention.

FIG. 3 shows a more detailed view of various architectural variations of DSLAM modules shown in FIG. 2 which are enabled by the current invention. An exploded representation of a rack within the DSLAM module 202 of the central office 100 is shown. Additionally an exploded partial view of a rack within a corresponding DSLAM module within CO 102 is also shown. The rack includes a plurality of line cards 320, 324, 328, 332, 342, 346 and 360 coupled to one or both of a packet based DSP bus 310A and an ATM bus 312A. The ATM bus may implement a number of protocols including TCP/IP, SPX/IX etc. The choice of ATM bus is arbitrary, other packet based busses may be used instead. The DSP bus 310A implements a proprietary packet based architecture which allows communication of raw data between a selected AFE and a selected DSP. Each packet 302 includes a header identifying channel, and target, i.e. DSP or AFE.

The details of that bus will be set forth in greater detail in the following FIGS. 4–7. AFE Line cards 320,324 each include a plurality of AFEs, e.g. AFEs 322 and 326, respectively each AFE line card is coupled to at least one subscriber line. Each of the line cards also couples to DSP bus 310A. DSP line card 328 includes at least one DSP, e.g. DSP 330. The DSP also couples to DSP bus 310A. Upstream raw digital data from subscribers 110 or 112 is digitized by a corresponding one of AFEs 322 or 326 and passed in packet form onto DSP bus 310A for processing by a requesting one of the DSPs on line card 328. When multiple DSPs are accessing the bus they may have their access arbitrated by a bus arbitrator 340 present on line card 332. This line card couples to both the DSP bus 310A as well as the ATM bus. Line card 346, is a universal line card which contains multiple AFE-'s e.g. AFE 348 coupled via an on card DSP bus 350 to a DSP 352 on the line card. The AFEs are coupled via xDSL subscriber lines to subscriber 114. ATM data provided from bus 312A to this line card passes directly to a corresponding one of subscribers, e.g. subscriber 114. Raw data on DSP bus 310A may be routed beyond CO 100, e.g. to CO 102 for processing by a corresponding line card with DSP resources in that office as well. Such load balancing would be equally appropriate assuming a gigabit fiber link between CO/DLC/ONU. Such routing is accomplished by a bridge module 344 on line card 342. The bridge module wraps raw data packet 302 received from an AFE line card, e.g. line card 320, with an appropriate ATM header and sends the wrapped packet 304 across an ATM access card 360 to a corresponding access card (not shown) in CO 102. In that office data is transferred across ATM bus 312B via bridge 364 online card 362 to DSP bus 310B. From that bus the DSP line card 366 and specifically a requesting DSP 368 processes the raw data and reroutes it back to the ATM network. In still another embodiment of the invention device packets 300 are utilized to control channel flow and control parameters within the various submodules of a DSP. This latter embodiment enables multipath, multiprotocol xDSL support within each DSP. This packet structure and the processes for handling it will be set forth in detail in the following FIGS. 4, 13 and 15.

Figure 4:
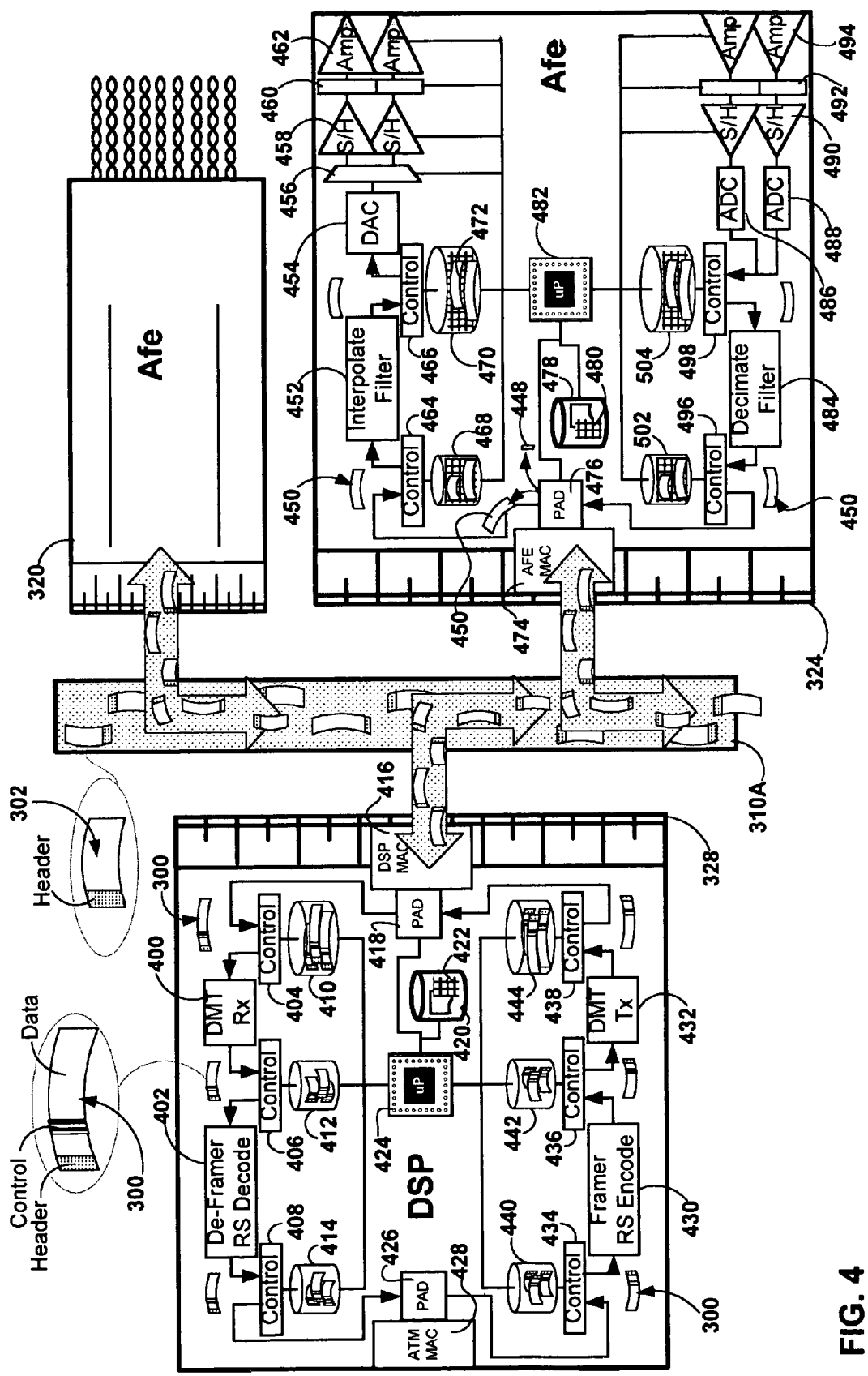
FIG. 4 is a more detailed view of one of the architectural variations shown in FIG. 3 in which a plurality of AFEs are coupled to a DSP.

FIG. 4 is a more detailed view of one of the architectural variations shown in FIG. 3 in which a plurality of AFEs are coupled to a DSP. FIG. 4 shows packet based raw data processing both between a DSP and AFE as well as within each DSP and AFE. Packet processing between DSP and AFE modules involves transfer of bus packets 302 (See FIGS. 6A–B). Packet processing within a DSP may involve device packets 300 (See FIGS. 13A–B). Packet processing within an AFE may involve raw data packets 450. These will be discussed in the following text.

These modules, AFE and DSP, may be found on a single universal line card, such as line card 348 in FIG. 3. They may alternately be displaced from one another on separate line cards linked by a DSP bus, such as line cards 320 and 328 shown in FIG. 3. In still another embodiment they may be found displaced across an ATM network such as is the case discussed above in connection with line cards 320 and 366.

DSP line card 328 includes one or more DSP's. In an embodiment of the invention each may include structures set forth in the figure for handling of multiple line codes and multiple channels. The line card includes, a DSP medium access control (MAC) 416 which handles packet transfers to and from the DSP bus. That line card implements processes set forth in FIG. 8A. The MAC couples with a packet assembler/disassembler (PAD) 418. For received DSP bus packets, the PAD handles removal of the DSP bus packet header and insertion of the device header and control header which is part of the device packet 300. (See FIGS. 13A–B). These content of these headers is generated by the core processor 424 using statistics gathered by the de-framer 402, such as gain tables, or embedded operations channel communications from the subscriber side. The PAD embeds the required commands generated by the core processor in the header or control portions of the device packet header. Upstream device packets 300 (Receive packets) pass into a first-in-first-out FIFO buffer 410 which is controlled by FIFO controller 404. These packets correspond with multiple protocols and multiple channels. Each is labeled accordingly. The receive processing engine 400 in this case a DMT engine fetches packets and processes the data in them in a manner appropriate for the protocol, channel and command instructions, if any, indicated by the header. The processed data is then placed in the next FIFO buffer 412 which is controlled by controller 406. The next module in the receive pipeline is the De-Framer and Reed Solomon Decoder 402. This module reads the next device packet and processes the data in it in accordance with the instructions or parameters in its header. The processed de-framed data is passed to the final FIFO buffer 414 which is controlled by controller 408. That data is then passed to the ATM pad 426 for wrapping with an ATM header and removal of the device header. From the The ATM MAC 428 then places the data with an ATM packet on the ATM network 140 (see FIG. 2).

Control of the receive modules, e.g. DMT engine 400 and De-Framer Decoder 402 as well as submodules thereof is implemented as follows. The core processor 424 has DMA access to the FIFO buffer 414 from which it gathers statistical information on each channel including gain tables, or gain table change requests from the subscriber as well as instructions in the embedded operations portion of the channel. Those tables 422 are stored by the core processor in memory 420. When a change in gain table for a particular channel is called for the core processor sends instructions regarding the change in the header of the device packet for that channel via PAD 418 and writes the new gain table to a memory which can be accessed by the appropriate module, i.e. DMT module 400 or the appropriate submodule thereof as a packet corresponding to that channel is received by the module. This technique of in band signaling with packet headers allows independent scheduling of actions on a channel by channel basis in a manner which does not require the direct control of the core processor. Instead each module in the transmit path can execute independently of the other at the appropriate time whatever actions are required of it as dictated by the information in the device header which it reads and executes.

This device architecture allows the DSP transmit and receive paths to be fabricated as independent modules or submodules which respond to packet header control information for processing of successive packets with different XDSL protocols, e.g. a packet with ADSL sample data followed by a packet with VDSL sampled data. Within the DMT Rx engine 400 for example, there may be submodules with independent processing capability such as: a time domain equalizer, a cyclic prefix remover, an DFT, a gain scaler, a trellis decoder and a tone reorderer, as well as filters, a windowers . . . etc and their counterparts on the DMT Tx engine in the transmit path. Each of these may independently respond to successive device headers to change parameters between successive packets. For example as successive packets from channels implementing G.Lite, ADSL and VDSL pass through the DMT Tx engine the number of tones will vary from 128 for G.lite, to 256 for ADSL, to 2048 for VDSL. The framer and de-framer will use protocol specific information associated with each of these channels to look for different frame and superframe boundaries.

On the downstream side, i.e. Transmit, the same architecture applies. ATM data which is unwrapped by PAD 426 is re-wrapped with a device header the contents of which are again dictated by the core processor 424. That processor embeds control information related to each channel in the packets corresponding to that channel. The device packets are then passed to the FIFO buffer 440 which is controlled by controller 434. The Framer and RS encoder 430 and or submodules thereof then processes these packets according to the information contained in their header or control portions of each device packet. The Framer then updates the device packet header and writes the resultant device packet to the next FIFO buffer 442 which is controlled by controller 436. The next module in the transmit pipeline is the DMT transmit module 432. This module accepts the data and processes it for transmission. Transmission processing may include: tone ordering, trellis encoding, gain scaling, an IDFT, and cyclic prefix modules each with independent ability to read and respond to device headers.

From the DMT Tx engine 432 an updated device packet is placed in the FIFO buffer 444 under the control of controller 438. From this buffer the device packet is sent to PAD 418 where the device header is removed. The DSP PAD places the DSP packet 302 with an appropriate header onto the DSP bus 310A for transmission to the appropriate AFE and the appropriate channel and subscriber line within the AFE (See FIG. 6B).

Because the data flow in the AFE allows a more linear treatment of each channel of information an out of band control process is utilized within the AFE. In contrast to the DSP device packets which are used to coordinate various independent modules within the DSP the AFE accomplished channel and protocol changeovers with a slightly different control method.

A packet on the bus 310A directed to AFE 324 is detected by AFE MAC 474 on the basis of information contained in the packet header. The packet is passed to PAD 476 which removes the header 448 and sends it to the core processor 482 and the packet header information including channel ID to the core processors memory 478. The information is contained in a table 480. The raw data 450 is passed to a FIFO buffer 468 under the control of controller 464. Each channel has a memory mapped location in that buffer. The interpolator 452 reads a fixed amount of data from each channel location in the FIFO buffer. The amount of data read varies for each channel depending on the bandwidth of the channel. The amount of data read during each bus interval (See FIG. 5) is governed by entries in the control table 480 for each channel which is established during channel setup using information contained in a bus packet 302 which contains control parameters for the channel. The interpolator upsamples the data and low pass filters it to reduce the noise introduced by the DSP. Implementing interpolation in the AFE as opposed to the DSP has the advantage of lowering the bandwidth requirements of the DSP bus 310A From the interpolator data is passed to the FIFO buffer 470 under the control of controller 466. The packets 472 have increased in size as a result of the interpolation. The next module in the transmit pipeline is a DAC 454 which processes each channel in accordance with commands received from the core processor 482 using control parameters downloaded to the control table 480 during channel setup. The analog output of the DAC is passed via analog mux to a corresponding one of sample and hold devices 458. Each sample and hold is associated with a corresponding subscriber line. The sampled data is filtered in analog filters 460 and amplified by line amplifiers 462. The parameters for each of these devices, i.e. filter coefficients, amplifier gain etc. are controlled by the core processor using the above discussed control table 480 and the appropriate parameters stored therein during session set up. For example, where successive packets carry packets with G.Lite, ADSL, and VDSL protocols the sample rate of the analog mux 456 the filter parameters for filter 460 and the gain of the analog amplifiers will vary for each packet. This "on the fly" configurability allows a single transmit or receive pipeline to be used for multiple concurrent protocols.

On the upstream path, the receive path, individual subscriber lines couple to individual line amplifiers 494 through splitter and hybrids (not shown). Each channel is passed through analog filters 492, sample and hold modules 490 and dedicated ADC modules 486–488. As discussed above in connection with the transmit path, each of these components is configured on the fly for each new packet depending on the protocol associated with it. Each channel of data is placed in a memory mapped location of FIFO memory 504 under the control of controller 498. From the controller fixed amounts of data for each channel, varying depending on the bandwidth of the channel, are processed by the decimator and filter module 484. The amount processed for each channel is determined based on parameters stored in the control table. Those parameters may be written to that table during the setup phase for each channel.

From the decimator and filter the raw data is passed to FIFO buffer 502 which is controlled by controller 496. Scheduled amounts of this data are moved to PAD 476 during each bus interval. The PAD wraps the raw data in a DSP header with channel ID and other information which allows the receiving DSP to properly process it (See FIG. 6A).

In an alternate embodiment of the invention the same packet based control principal may be used in both the transmit and receive path to implement not only multiple protocols concurrently but alternate lines codes, e.g. CAP/QAM.

Figure 5:
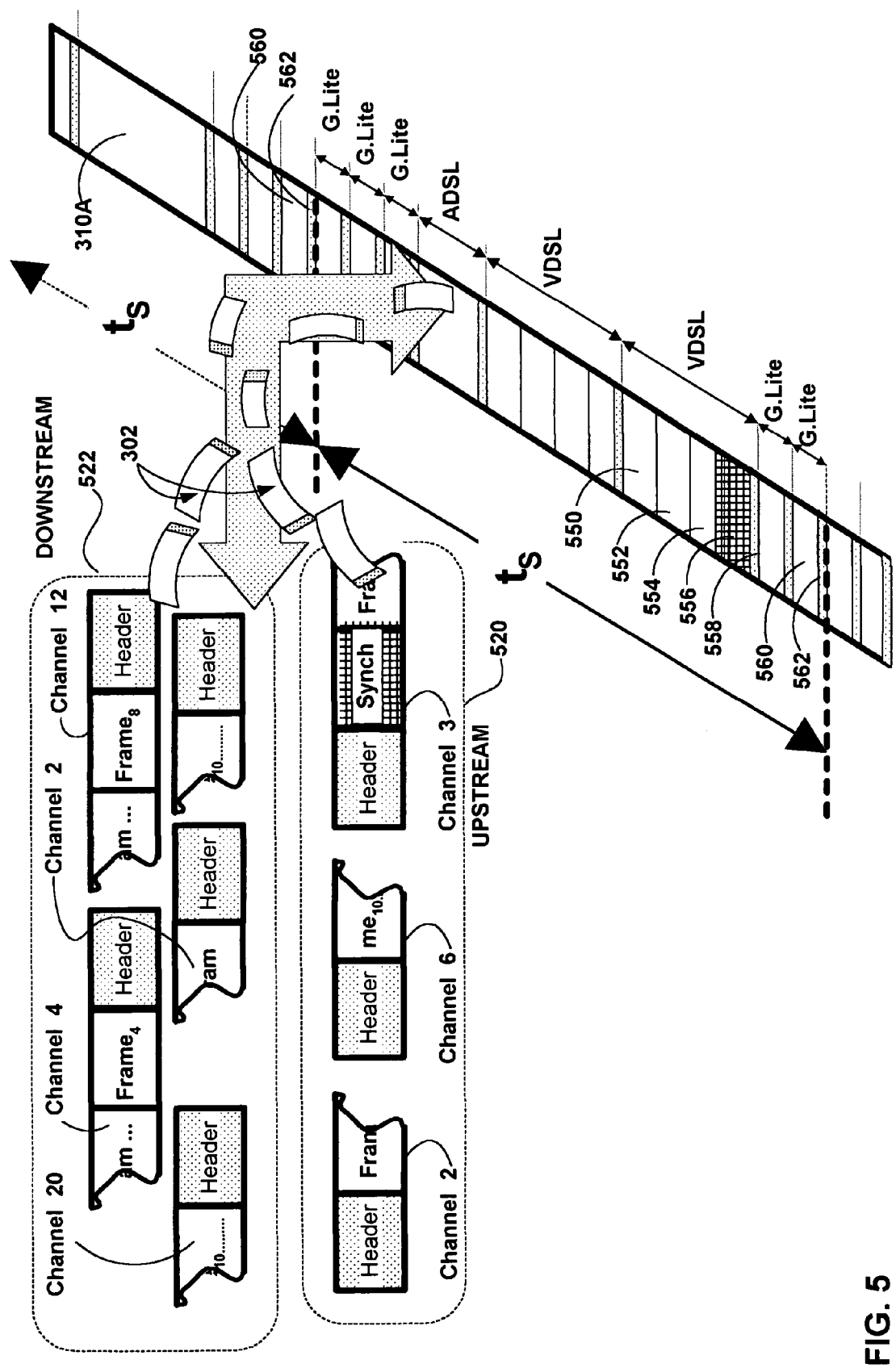
FIG. 5 shows packet transport of subscriber line data across the system bus shown in FIG. 4.

FIG. 5 shows packet transport of subscriber line data across the system bus shown in FIG. 4. A plurality of upstream 520 and downstream 522 DSP bus packets 302 are shown being placed on the DSP bus 310A. The bus transports each channel in an amount corresponding to the bandwidth requirements of each individual channel. The utilization of the bus is governed the DSP which is placing data on the bus. Each channel has a configurable interval of time in a round robin sequence governed by the DSP for upstream and downstream transport between a DSP and a corresponding AFE. Frames 550–556 are part of a single VDSL channel. Header 558 is the header for that channel. The packet boundaries on the bus need not, and in fact normally will not coincide in either the upstream or downstream direction with frame or superframe boundaries. This allows higher data throughput and reduced complexity in bus design. Packet 560 and associated header 562 mark the end of a bus interval $t_s$.

FIGS. 6A–B are detailed structural views of the receive and transmit packets 302 respectively for transport of data on the system bus shown in FIG. 5. The transmit packet comprises a header 600 and a payload portion 602. The header includes fixed length fields 604–614. Field 604 records the channel or control register address. Field 614 is the read/write field. If the field is set with a read bit the DSP is requesting data from the AFE. The data 616 may be channel data or information from a specific module within the AFE. These latter requests are register requests. A register is the memory location where control parameters for a module are stored. They are memory mapped and are part of control table 480 (See FIG. 4). Alternately, if field 614 is set with a write bit the transmit packet's payload portion 602 contains data to be written to a corresponding channel or register. If the data is written to a channel it is communicated through the AFE transmit path for that channel to the subscriber. If the data is written to a register it is communicated to one or more of the modules in the transmit/receive path for processing a particular channel. The DSP ID field 606 is an optional identification field useful when more than one DSP can access the DSP bus. The AFE ID field 608 is used to target a specific AFE on the bus for processing of the packet. When the AFE MAC 474 (See FIG. 4) detects this field it accepts the packet from the bus. The transmit length field 610 indicates for write operations how much data the AFE will expect in the payload portion 602 of the packet. The receive length accompanies a read request in field 614 and indicates how much data the AFE should pass to the requesting DSP.

The receive packet passes from the AFE to the corresponding DSP on bus 310A. The bus is bi-directional. The receive packet contains a header 620 and a payload 622. The header contains fields 626,628 and 630 for indicating the receiving DSP, the sending AFE, and the length of the payload in the packet, respectively. Optionally the packet may contain a channel/register address field 624 for correlating the payload with a specific channel and register. Where a single DSP masters the bus 310A this field may not be required.

Figure 7B:
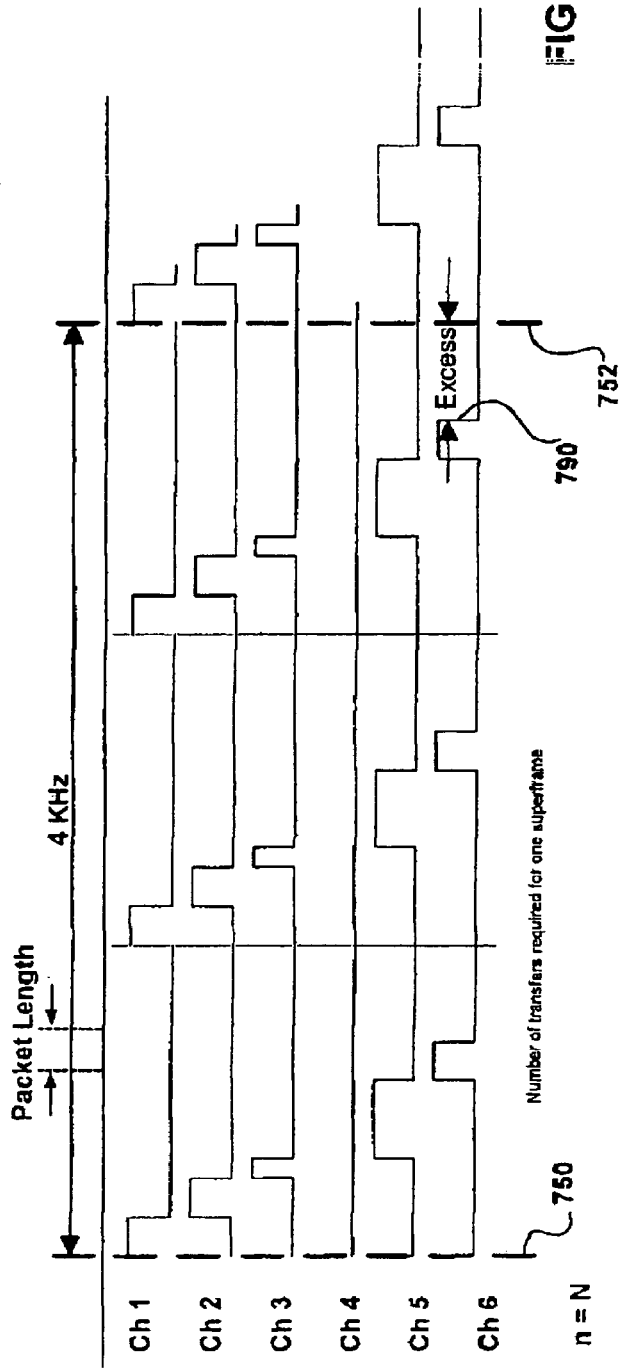
FIGS. 7A–B are detailed timing diagrams of one and many channels of subscriber line data respectively on the bus shown in FIG. 5.
Figure 7A:
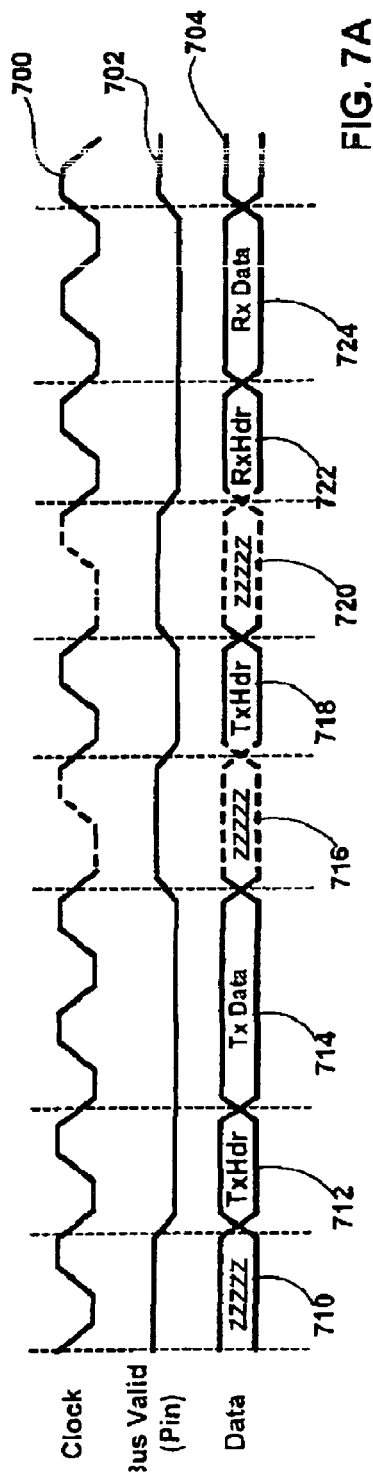

FIGS. 7A–B are detailed timing diagrams of one and many channels of subscriber line data respectively on the bus shown in FIG. 5. FIG. 7A shows a bus signal diagram with a clock signal 700 a bus valid pin signal 702 and a data signal 704. This bus employs master-slave protocol where all bus transactions start with a header byte transmitted by the bus master. In an embodiment of the invention the bus is a synchronous bus with all master and slaves served by the same clock source. Only one device on the bus is selected to be the bus master. The bus master is responsible for bus scheduling to guarantee there in no bus contention. The bus master transmits header byte when all the slaves on the bus have de-asserted their BUS_VALID signal and are in listening state. The header holds the receivers address information as well as the type of bus transaction to be followed.

Transmit operation is when data is transmitted from the Master (DSP) to a slave (AFE). When all the slaves on the bus have de-asserted their BUSVALID signals 710 and are in listening state the bus master transmits a Transmit Header word 712. The header holds the AFE and channel select address information as well as the transfer length. Data transfer 714 begins immediately after the header word. The BUSVALID signal 702 is asserted by the master (DSP) when header byte is transmitted and remains asserted until data transmit is complete. Transmit operation ends 716 when BUSVALID is de-asserted.

Receive operation is when data is transmitted from a slave to the master (DSP). Bus master initiates the receive operation. Bus master selects the AFE device by broadcasting a Transmit Header 718 on the bus. BUSVALID signal is asserted by the master during header cycle and released 720 immediately. The header holds the AFE and Channel select address information as well as the transfer length. The selected AFE takes control of the bus one or more cycles after header is received by asserting the BUSVALID 722. The slave transmits the transmit header word followed by the data 724.

All devices on the bus must wait for BUSVALID to be de-asserted before attempting to transmit data on the bus. Slave devices are selected by the Master device to use the bus. Master device must guarantee by design that only one slave device is selected at any one time. A data transaction by a slave can not be interrupted by the master until it is complete. The transfer length per packet in either direction is controlled by the header information. In the transmit operation DSP sets TLEGTH 610 value in the header and transmits that many number of bytes of data to the selected channel. FIFO overrun/under-run status bits are set accordingly in the status registers in the target AFE. In receive operation DSP sets the upper limit of packet transfer length 612 in the transmit header and the AFE transmits that many bytes to DSP or if not available can choose to transmit less bytes by setting the number of bytes sent 630 in the receive header accordingly. FIFO overrun/under-run condition is recorded in the status registers. The DSP uses a Channel Schedule table 422 in the DSP to access the channels (See FIG. 4). This table holds entries for packet transfer length per channel for both receive and transmit. A zero entry in these fields indicates a channel is not active (Alternately a bit can be assigned to indicate active/none-active per channel in the table). The DSP may service the Channel Schedule table in a circular fashion. This table in an embodiment of the invention is serviced at n×4 KHz frequency. The value of n is programmable and is directly related to the packet sizes selected. This guaranties the bandwidth allocated to each channel. There is no need to synchronize this 4 KHz to frame boundaries in each channel as long as the packet size is a fraction of the frame size.

FIG. 7B shows how DSP bus bandwidth is allocated to six channels. Channel 4 is inactive. Channels 1, 2, and 6 are ADSL. Channel 5 is VDSL, and channel 3 is G.lite. The length of the transmit/receive packet and the number of transfers per 4 Khz cycle 750–752 determines the total bandwidth per channel. Number of transfers per cycle is the same for all active channels but the length of transfer can be different per channel. The number of transfers per cycle and the transfer length must be chosen such that the excess bandwidth period 790 is minimum (less than 4 Khz/No TX per cycle).

Figure 8A:
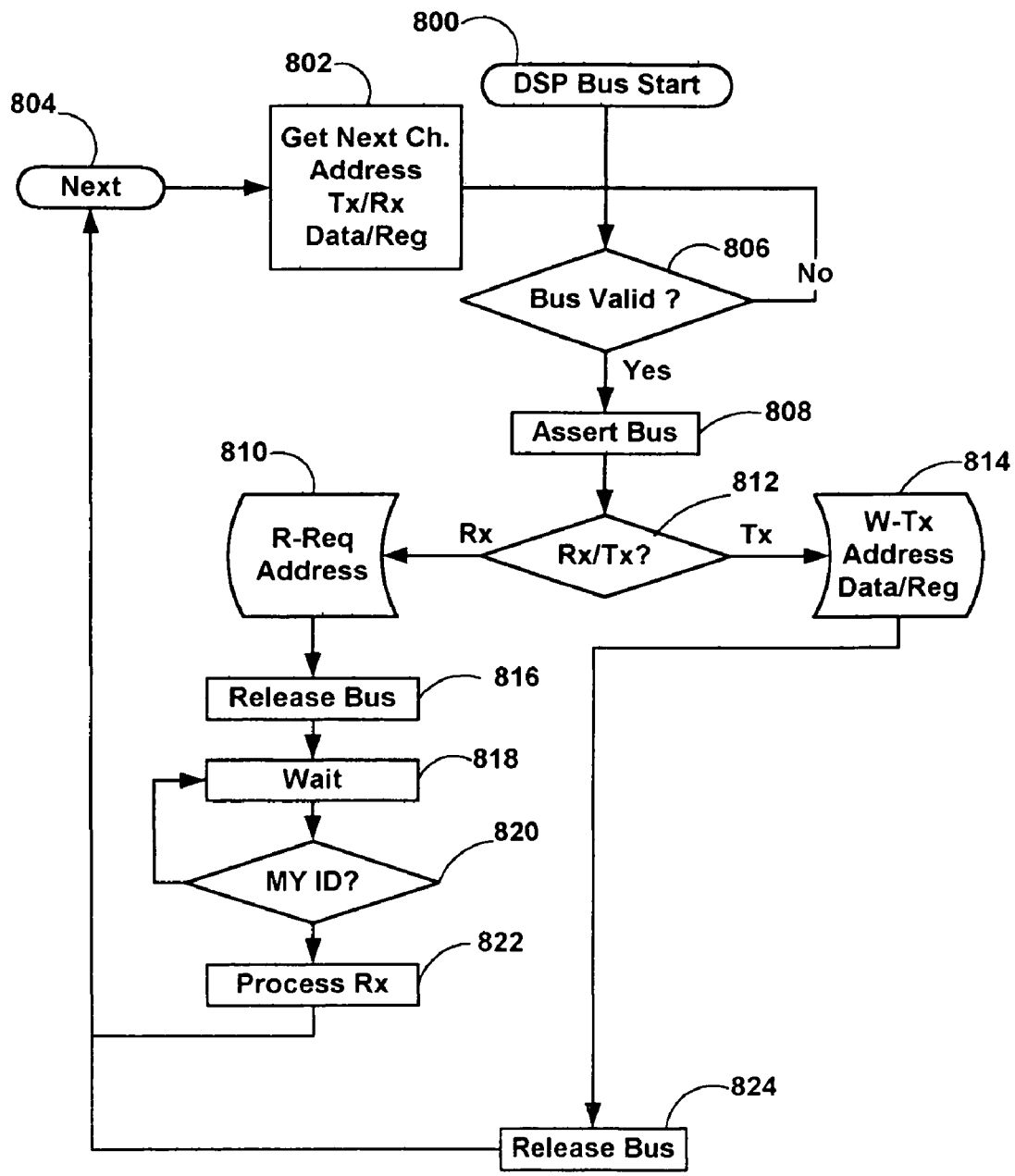
Figure 33:
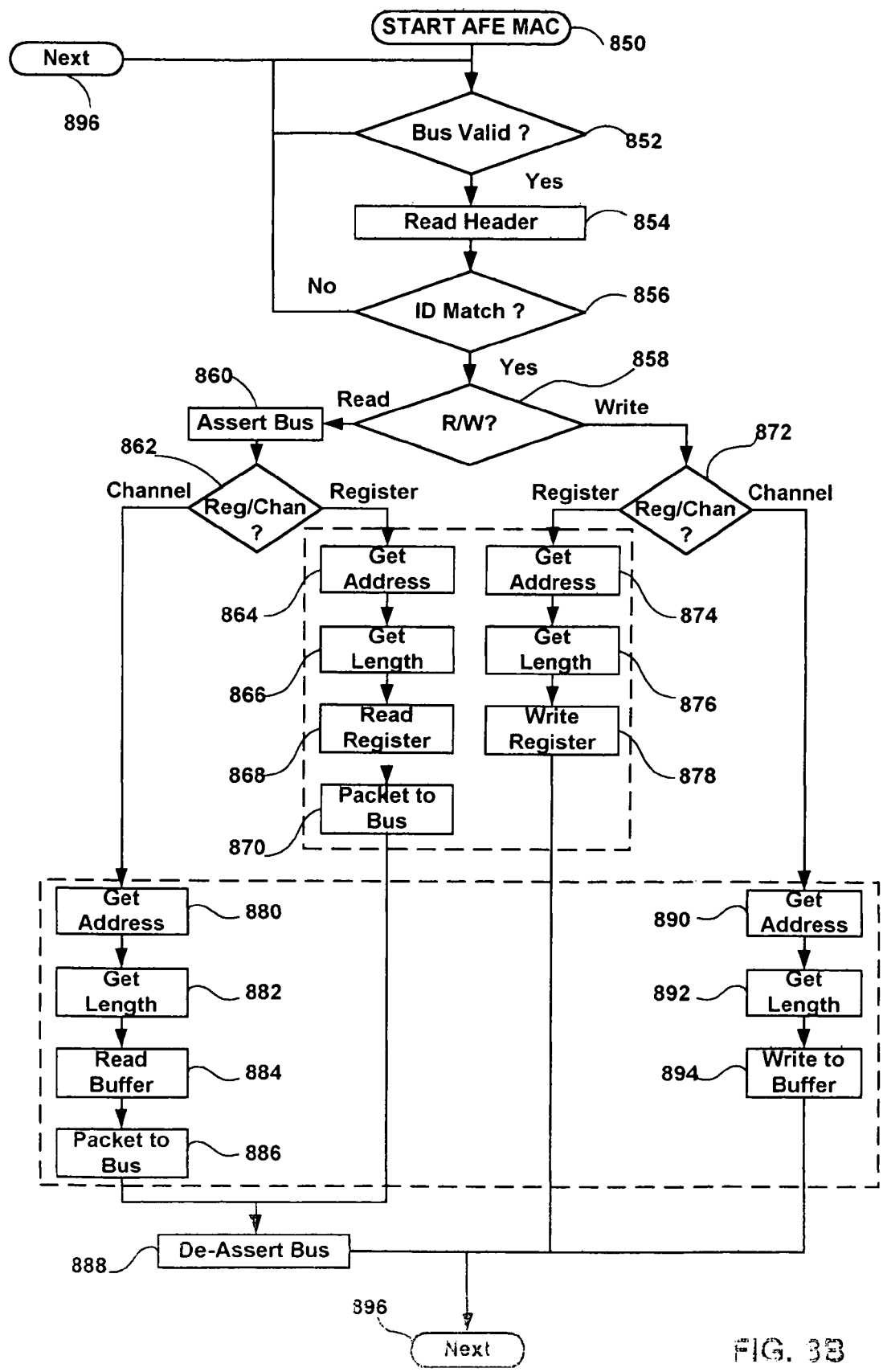

FIGS. 8A–B are process flow diagrams showing a portion of the processes executed by the DSP and AFE I/O interfaces respectively for the transport of data across the bus shown in FIG. 5.

In FIG. 8A processing for the DSP I/O interface begins at start block 800 in which the DSP I/O interface including PAD 418 FIFO buffer controllers 404,438 and DSP MAC 416 (See FIG. 4) are enabled. Control is passed to decision block 806 in which a determination is made as to the status of bus valid signal line 702 (See FIG. 7A). When that determination is in the affirmative control is passed to process block 808 in which the bus valid signal line is asserted, after which control is passed to decision block 812. In decision block 812 a determination is made based on the channel schedule received from the core processor 424 and/or stored in schedule table 422 as to whether the next scheduled bus transaction for the DSP is a Tx or Rx. If the scheduled operation is a transmit then the PAD 418 gets the next packet to be transmitted from FIFO controller 438 and appends the appropriate header with channel ID etc. in process 814. Subsequently control is passed to process 824 in which the bus is released by MAC 416. Alternately, if in decision process 812 an receive operation for a selected channel is indicated control is passed to request block 810 in which the PAD 418 prepares a read request header and places it on the bus. Subsequently control passes to process 816 in which the bus valid signal line is de-asserted. Control is then passed to process 818 in which a wait state is introduced, subsequent to which a determination is made in decision block 820 as to whether the bus has been reasserted by the responding AFE. This may also involve a determination as to whether the received packet has an DSP ID field 626 (See FIG. 6A) which corresponds with that of the receiving DSP. If the determination is affirmative, control passes to process block 822 for receipt of the data which is written to FIFO buffer 410 via controller 404. Control then returns to next block 804 in which the core processor supplies the next channel, address, state (Tx/Rx) and other information to the PAD in process 802. Control then returns to decision block 806.

In FIG. 8B processing for the AFE I/O interface is set forth. That interface includes AFE MAC 474, PAD 476 and FIFO controllers 464,496 and associated buffers 468,502. Processing begins at start block 850 from which control passes to decision process 852. In decision process 852 a determination is made by the AFE MAC as to whether the Bus Valid signal line is asserted. In the event of an affirmative determination control is passed to process 854. In process 854 the header is read and in the following decision process 856 a determination is made as to whether the AFE ID 606 (See FIG. 6B) in the header matches the AFE ID. In the event of an affirmative decision control is passed to decision block 858. In decision block 858 a determination is made as to whether a read or write tag is present in header field 614 (See FIG. 6B). If a read operation is indicated then control passes then the AFE MAC asserts 860 the bus valid signal line after which control passes to decision block 862. In decision block 862 the address field 604 in the header (See FIG. 6B) is read to determine whether a register or channel access is requested by the DSP. If a read register request has been indicated then in processes 864–870 the address to be read, the length of the data to be read and the actual reading and packetizing of the data on the bus with the appropriate header are implemented by the combined AFE I/O interface components. Subsequently, control passes to process 888 in which the bus is deasserted and control is passed to next block 896.

Alternately, if in decision process 862 a read channel operation is indicated then in processes 880–886 the channel address and length are determined based on the contents of header fields 604 and 612. Then the FIFO buffer supplies the appropriate data for the selected channel to the PAD 476 appends the appropriate information in the header of the outgoing packet and the MAC 474 (See FIG. 4) places that data on the bus 310A.

Alternately, if in decision process 858 a determination is made that the DSP header indicates a write operation then control is passed to decision process 872 in which a determination is made on the basis of the address in the header field 604 (See FIG. 6B) as to whether the write is directed to a register, e.g control table 480 (See FIG. 4) or to a channel. If the write is directed to a channel then in processes 874–878 the payload portion of the bus packet 302 (See FIG. 4) is passed by the AFE I/O interface to the appropriate register after which control is returned to next block 896. Alternatively, if the payload to be written is destined for a channel for a selected subscriber line then control is passed to processes 890–894 in which the payload of the appropriate length is removed from the bus and written to the transmit FIFO buffer 468, subsequent to which control returns to next process block 896.

Figure 9:
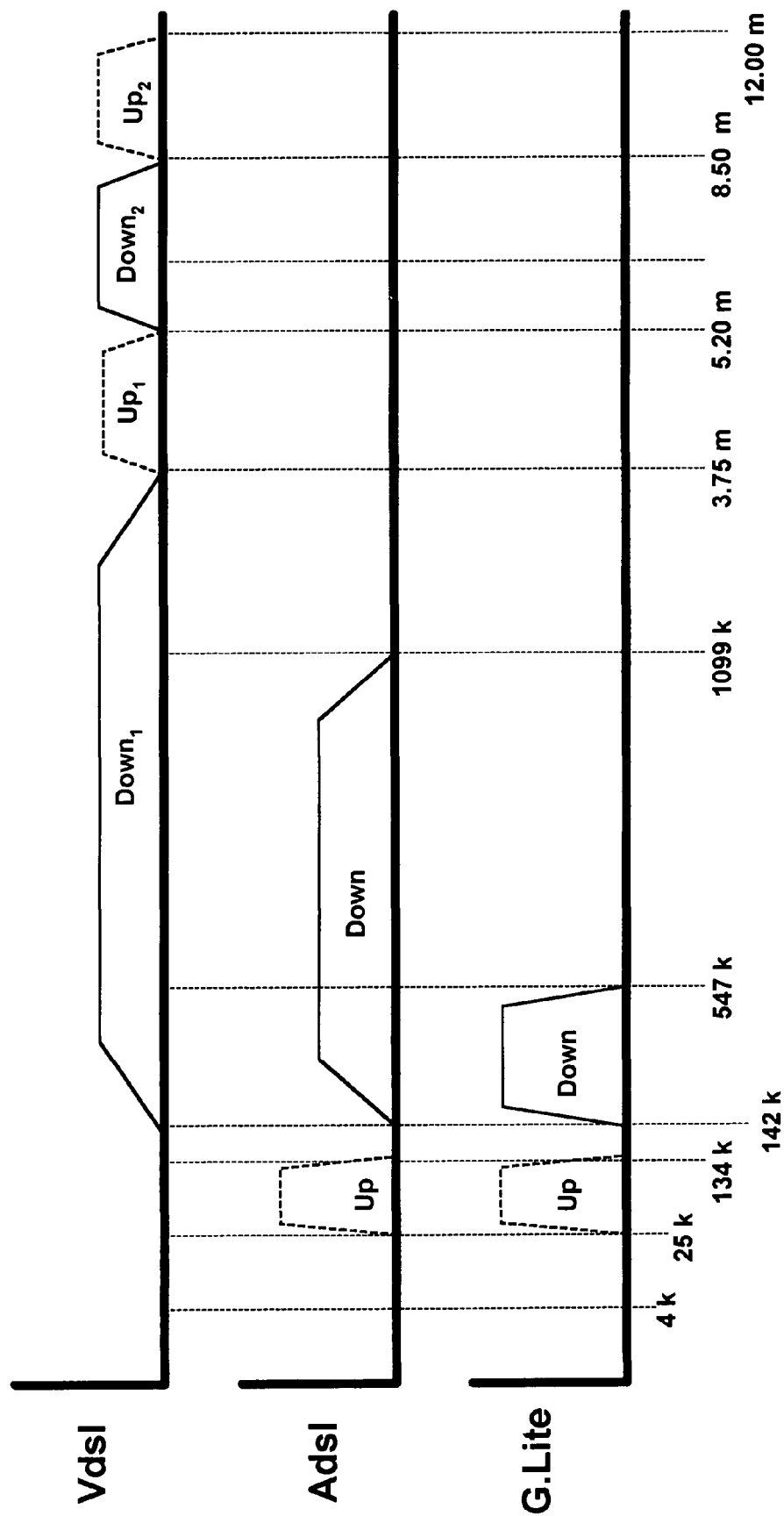
FIG. 9 is a signal diagram showing the available bandwidth associated with selected xDSL subscriber line standards, i.e. G.Lite, ADSL and VDSL.

FIG. 9 is a signal diagram showing the available bandwidth associated with selected xDSL subscriber line standards, i.e. G.Lite, ADSL and VDSL and their associated upper and lower frequency limits for both upstream and downstream communication.

FIGS. 10A–D are tables listing distinct configuration parameters for several xDSL subscriber line standards, i.e. G.Lite, ADSL and VDSL. FIG. 10A shows transmit parameters in the DSP which may be regulated on a channel by channel basis on the transmit path of a DSP via values in the header or control portions of the device packets 300 discussed above in FIG. 4 as well as in the text accompanying the following FIGS. 13A–B and 14. FIG. 10B shows transmit parameters in the AFE which may be regulated on a channel by channel basis on the transmit path of an AFE via values derived in part from write operations to corresponding registers in the AFE by the DSP during channel setup or runtime. FIG. 1C shows corresponding parameters for the receive path of the DSP. FIG. 10D shows corresponding parameters for the transmit path of the AFE.

Figure 11A:
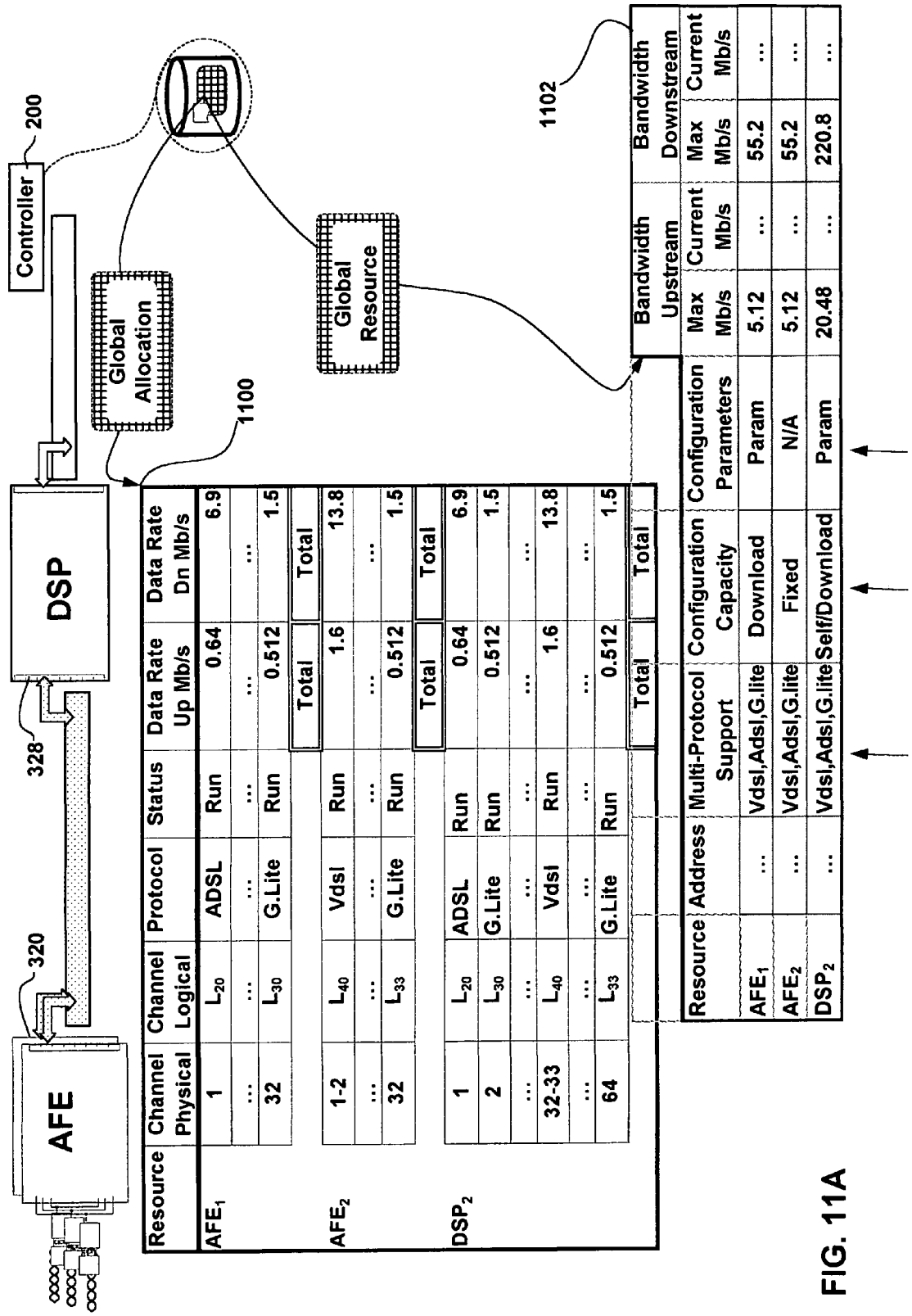
FIGS. 11A–C show data structures associated with the management and provisioning of xDSL communications according to an embodiment of the current invention.
Figure 11B:
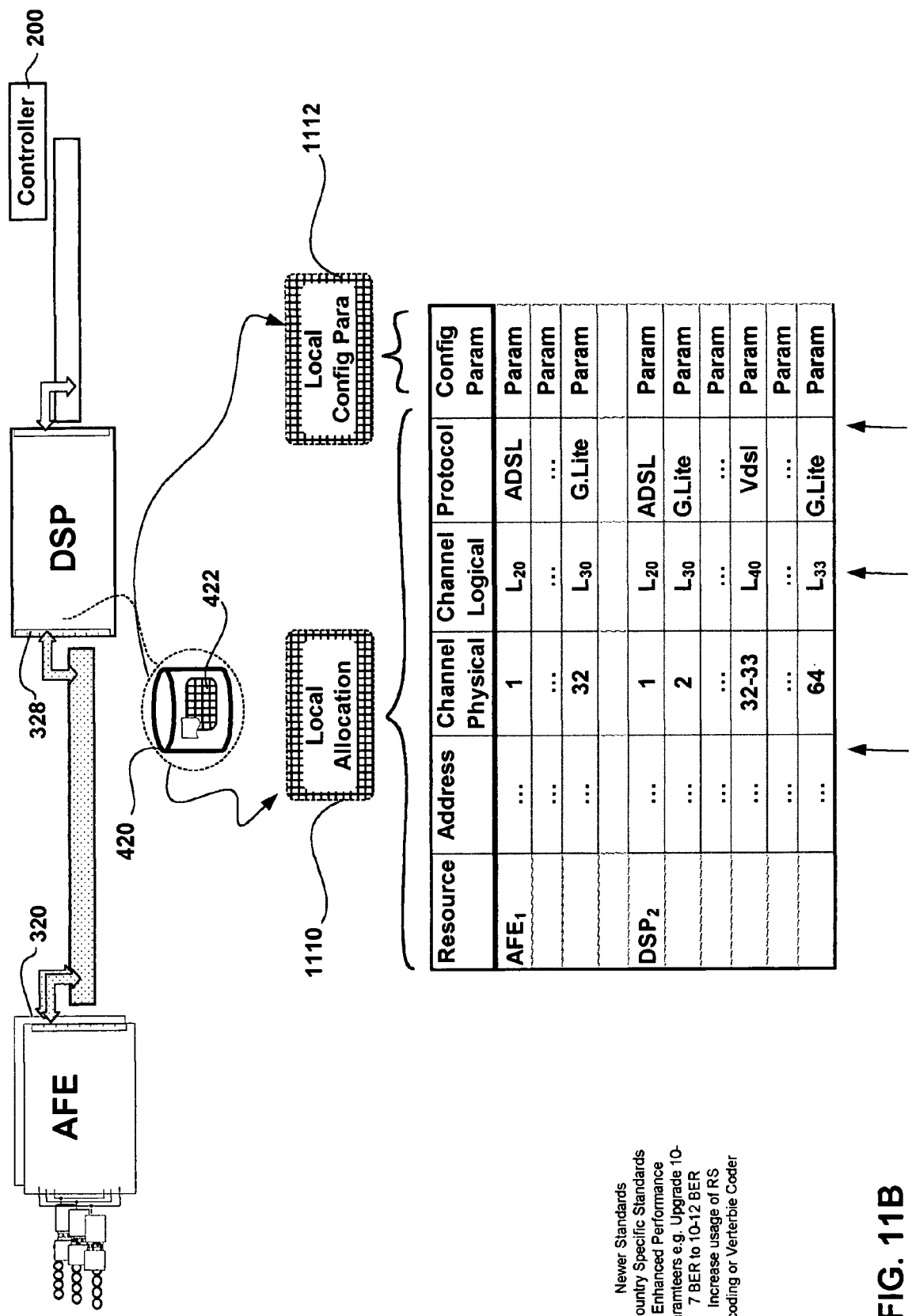
Figure 11C:
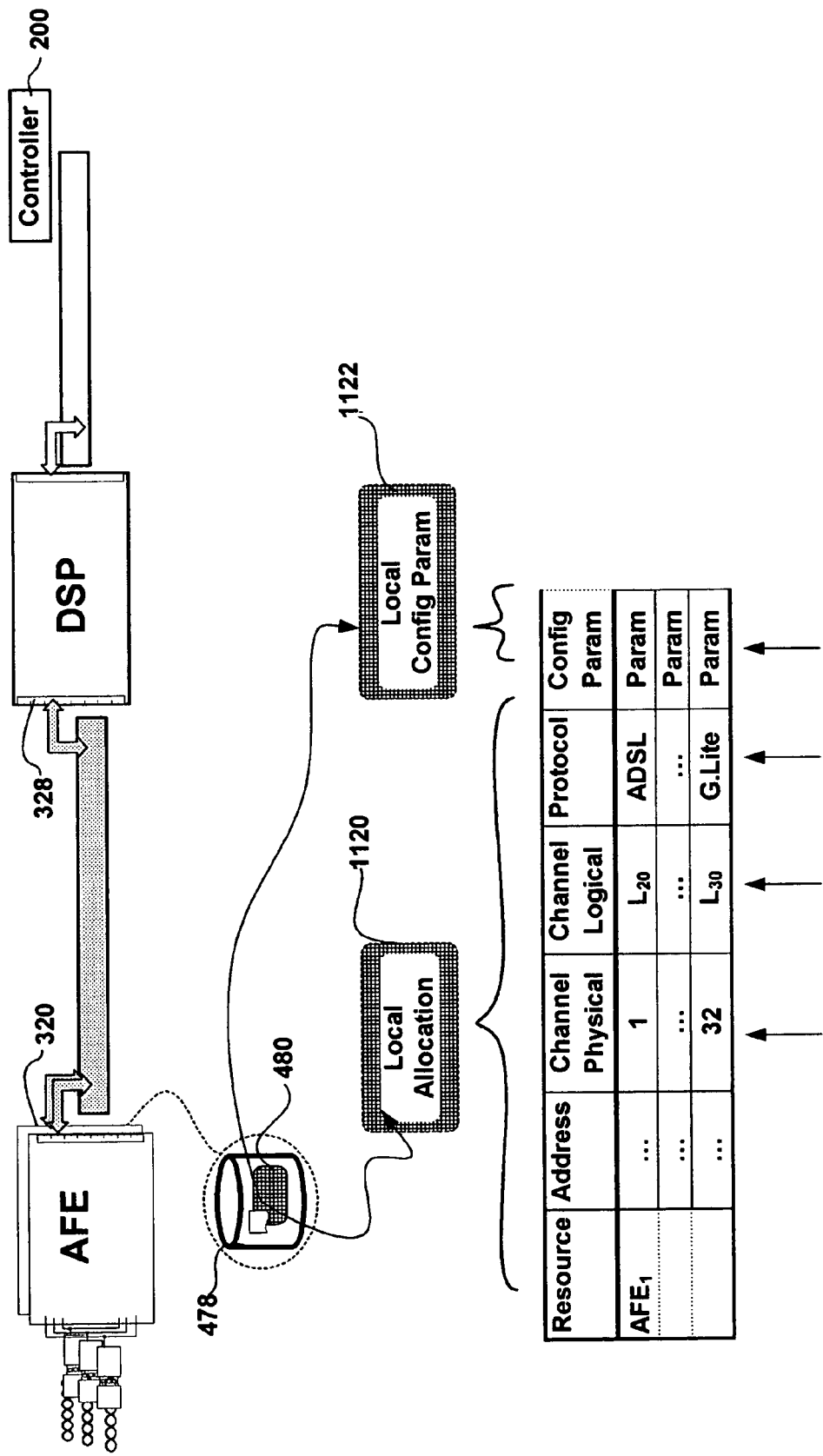

FIGS. 11A–C show data structures associated with the management and provisioning of xDSL communications according to an embodiment of the current invention. In FIG. 11A the global allocation table 1100 and the global resource table 1102 are shown. These indicate representative information available to the DSLAM controller 200 (See FIG. 2) for controlling the DSLAM line cards associated with the current invention. The global resource table contains information contains device specific information on operating capabilities and configurability of each resource in the DSLAM and may contain similar information for a global cluster of DSLAMs at more than one CO or remote access terminal. With this table the controller can intelligently target new channels to existing resources based on parameters. One of those parameters is the line codes supported by the device. Another is the ability of the device to upgrade itself with new parameters corresponding to new xDSL standards.

The global allocation table contains channel mapping between each resource, each physical channel the resource supports and the logical channel assigned to that physical channel. Each AFE is shown supporting a plurality of channels both physical and logical in various line codes and xDSL protocols. This reconfigurability of AFE and DSPs is a key feature of one embodiment of the invention. The global allocation table may also contain the actual or maximum data rate in the upstream and downstream direction allocated for the channel. With this information and the maximum bandwidth of each resource the DSLAM controller 200 may intelligently provision each new channel, and handle load balancing and statistical multiplexing.

FIG. 11B shows local allocation and configuration parameter tables 1110 and 1112 respectively that are located on the control table 422 of the DSP 328. That table contains the address of each AFE the DSP is servicing at any given time along with the logical and physical channel mapping for each channels and the protocol for each channel, e.g. ADSL, G.LITE, VDSL, etc. The local allocation table 1110 resulted from the provisioning initiated by the DSLAM controller. The Local Configuration parameter table may be derived either from an internal configuration parameter table or from downloading of new parameters supported by the DSP from the DSLAM controller.

FIG. 11C shows the local allocation and configuration parameter tables 1120–1122 respectively, associated with the AFE core processor control table 480. The allocation table contains physical and logical mapping and the protocol, e.g. ADSL, G.Lite, VDSL, associated with each physical/logical channel. The configuration parameter table contains parameters such as sample rate, filter coefficients etc. to be implemented by specific modules within the transmit or receive path for each module in the AFE.

Figure 12:
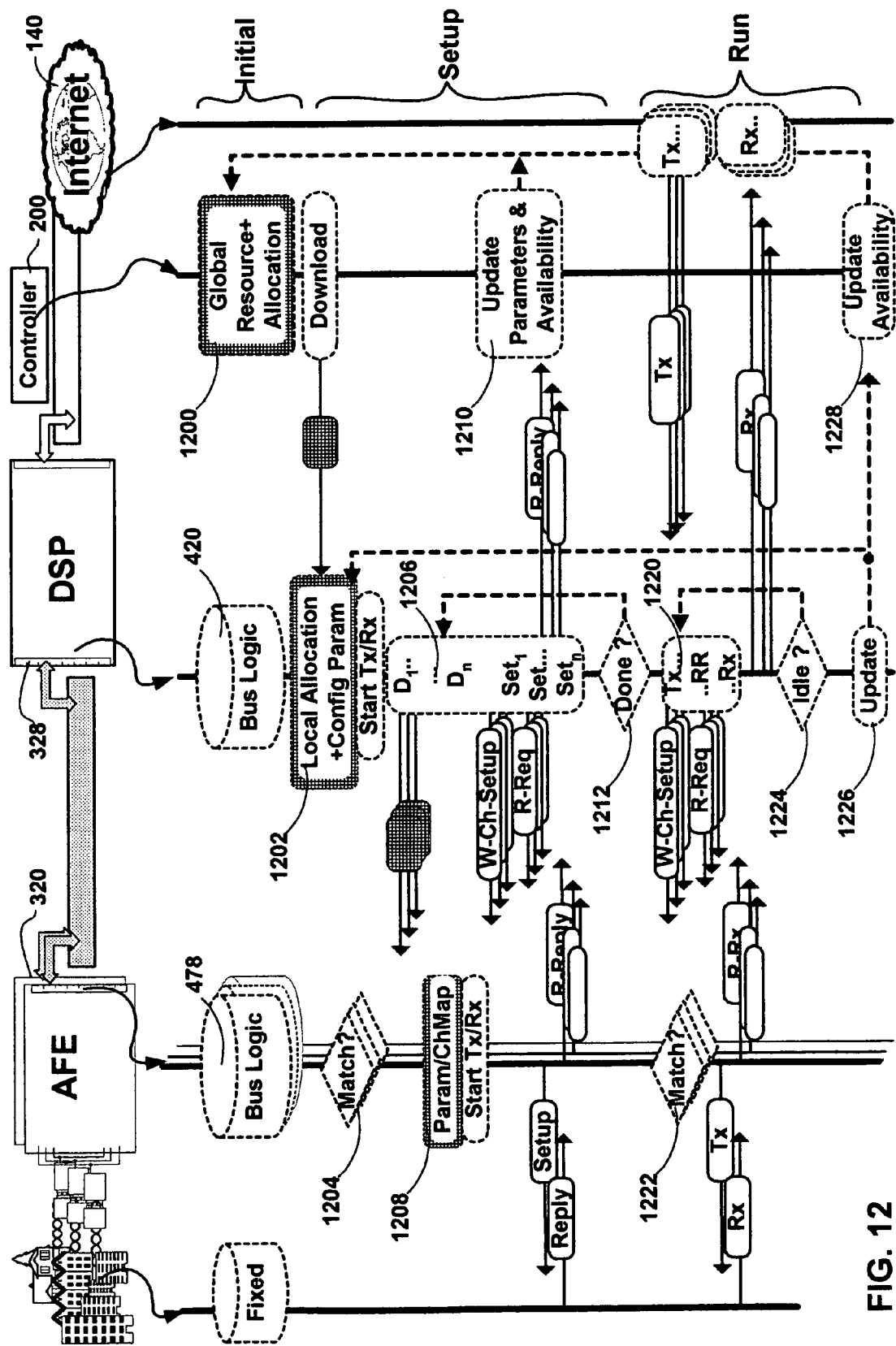
FIG. 12 is a candlestick diagram showing communications between a subscriber and a network during initial, setup, and run phases according to an embodiment of the current invention.

FIG. 12 is a candlestick diagram showing communications between a subscriber and a network during initial, setup, and run phases according to an embodiment of the current invention During the initial phase of provisioning a selected DSP to support a new channel all or part of the Local allocation table 1100 and the configuration parameter table 1112 may be downloaded 1200–1202 from the DSLAM controller 200 to the targeted DSP and stored in core processor memory 420. Next, the DSP I/O interface may download all or part of the Local Allocation or Local Configuration parameters to the targeted AFE for the new channel. The AFE I/O interface accepts a packet transfer if the header in the DSP bus packet 302 matches 1204 the ID of the targeted AFE. Then the AFE stores the configuration parameters for the new channel in the control table 480 (See FIG. 4).

Next setup of the channel is accomplished in accordance with whichever parameter the channel implements. This involves a setup handshake 1206–1208 of transmission and response between the DSP and the modem at the subscriber premise after which the subscriber line is characterized and the channel bit allocation and gains are established. If the channel is available that information may be used to update 1210 the Global Allocation table in the controller. When the setup is finished 1212, control passes to the run time operation.

Run time involves the round robin or related processing of successive packets for each channel, including a mix of protocols, with appropriate time segments allocated to each by the DSP and AFE. Each transmission 1220–1222 of data from the DSP to Subscriber is accomplished across the DSP bus through the transmission of a packet to the AFE and the detection and acceptance by the AFE of those packets with a header AFE ID corresponding to that of the targeted device. Upstream communications are requested by the associated DSP and transferred in response by the targeted AFE. When an idle is detected 1224 through either an in band or out of band signal by either the AFE or DSP that state will be updated 1226 in the local allocation table in the DSP and additionally updated 1228 in the Global resource table of the DSLAM controller.

FIGS. 13A–B are detailed structural views of the device packets 300 utilized in the DSP for the transport of data between various submodules of the DSP shown in FIG. 4. The device packets include a header portion 1300, a command portion 1302 and a payload 1306. In an embodiment of the invention the header is of a fixed length. The header includes five fields. Field 1320 contains a value corresponding with the size of the packet. Field 1326 identifies the channel associated with the packet. Field 1328 indicates any common operations among modules to be performed on a channel, i.e. active, inactive, idle etc. Field 1322 contains flags for each module in the associated path, i.e. transmit or receive, and a command size field 1324. The command portion 1302 may contain no command blocks or may contain command blocks for one or more of the modules/submodules on the transmit/receive path. In FIG. 13A three command blocks 1330,1332,1334 are shown.

As each module receives each packet it performs two operations on the header. An update of the packet data size is performed on every packet when the processes performed by the module, e.g. DFT or IDFT change the size of the payload. The module updates the value in field 1320 with the new packet size. The other operation is only performed when the module receives a module in which its, the modules, unique flag bit in field 1322 is set. If its flag bit is set, the module reads data starting from the start of the command portion 1302 in an amount corresponding with the command size indicated in field 1324. If the command is one to be executed on the current payload then the receiving module makes the changes and processes the payload data 1336. If the command sequence is to be performed on a subsequent packet then the module logs the command and frame reference and executes it at the appropriate frame. After reading the command and processing the data, and before transferring the processed device packet to the next module in the queue the detecting module performs the following operations. It deletes its command information effectively by writing the packet out with the succeeding command blocks 1332–1334 moved from the second and third positions to the first and second positions after the header portion 1300 (See FIG. 13B). Then the module updates both the command size in the command size field 1324 as well as the packet data size 1320.

Figure 14:
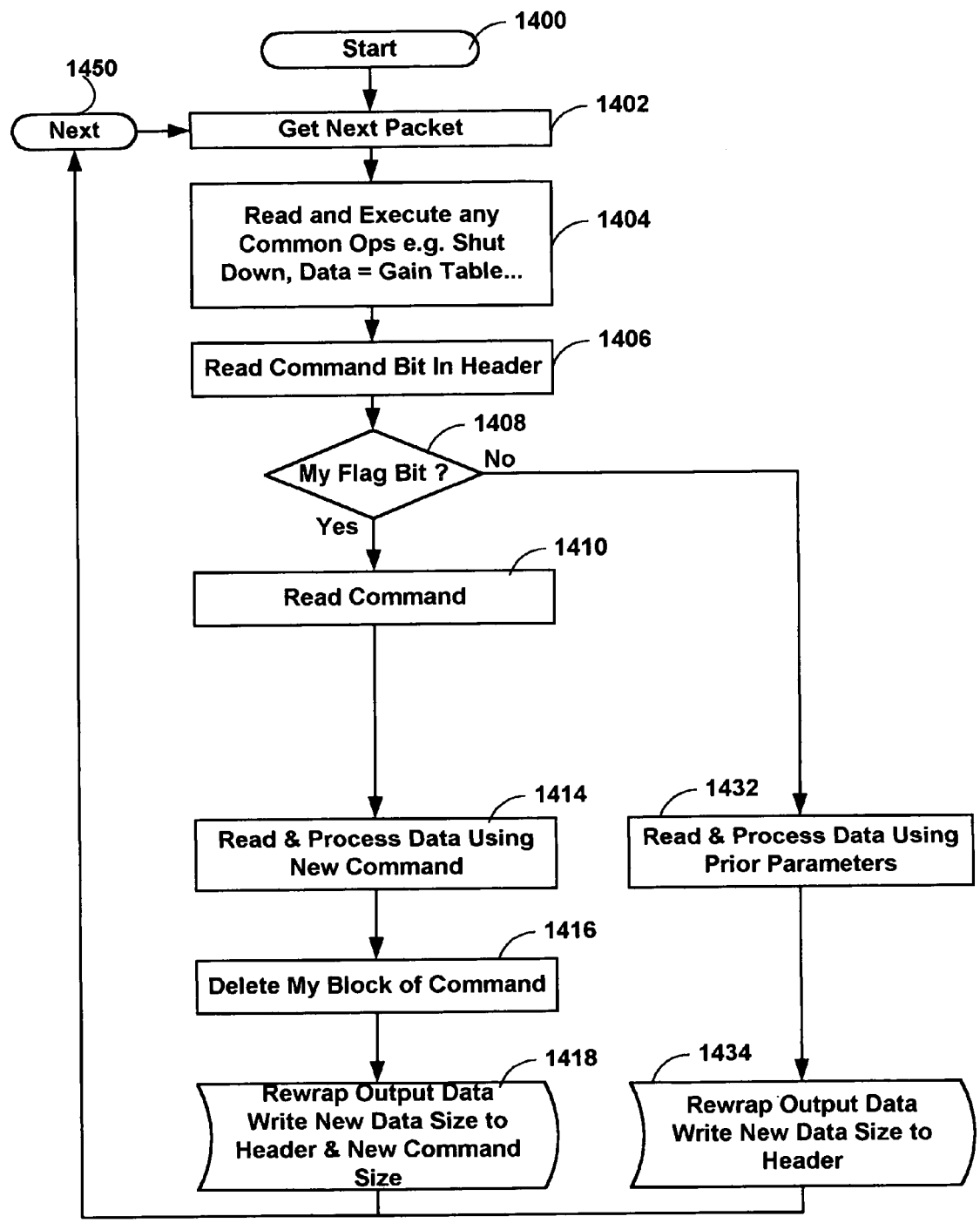
FIG. 14 is a process flow diagram of representative processes associated with an embodiment of the current invention, which processes are executed by various submodules of the DSP shown in FIG. 4 in response to receipt of device packets shown in FIGS. 13A–B.

FIG. 14 is a process flow diagram of representative processes associated with an embodiment of the current invention, which processes are executed by various submodules of the DSP shown in FIG. 4 in response to receipt of device packets shown in FIGS. 13A–B. This command sequence may in alternate embodiments of the invention be implemented on either the DSP or the AFE should timing, scheduling, scalability etc. make it advantageous to do so. Processing begins in start bock 1400 in which control is passed to process 1402 for the receipt of the next packet. Next in process 1404 the common ops field 1328 is read to see if there are any common ops in the header to be executed. Common ops include a state change for a channel, e.g. active->inactive/idle. Then in process 1406 the command bit in command flag field 1322 is read. If in decision process 1408 a determination is made that the flag bit for the corresponding module is not set then that module executes process 1432. In process 1432 the packet is processed using parameters previously associated with the channel in the modules channel specific lookup table. Next the module updates 1434 the header with the new data size in field 1320 and passes the packet to the next submodule or module or FIFO buffer. Alternately, if in decision process 1408 a determination is made that the flag bit for the module is set control is passed to processes 1410–1414 in which the command is read and the data is read and processed using the new command. Control then passes to processes 1416 and 1418 in which the detected command block is deleted and in which a updates to the header appended to the processed data are made to reflect changes in command size, packet size. Control then returns via next block 1450 to process 1402.

Figure 15:
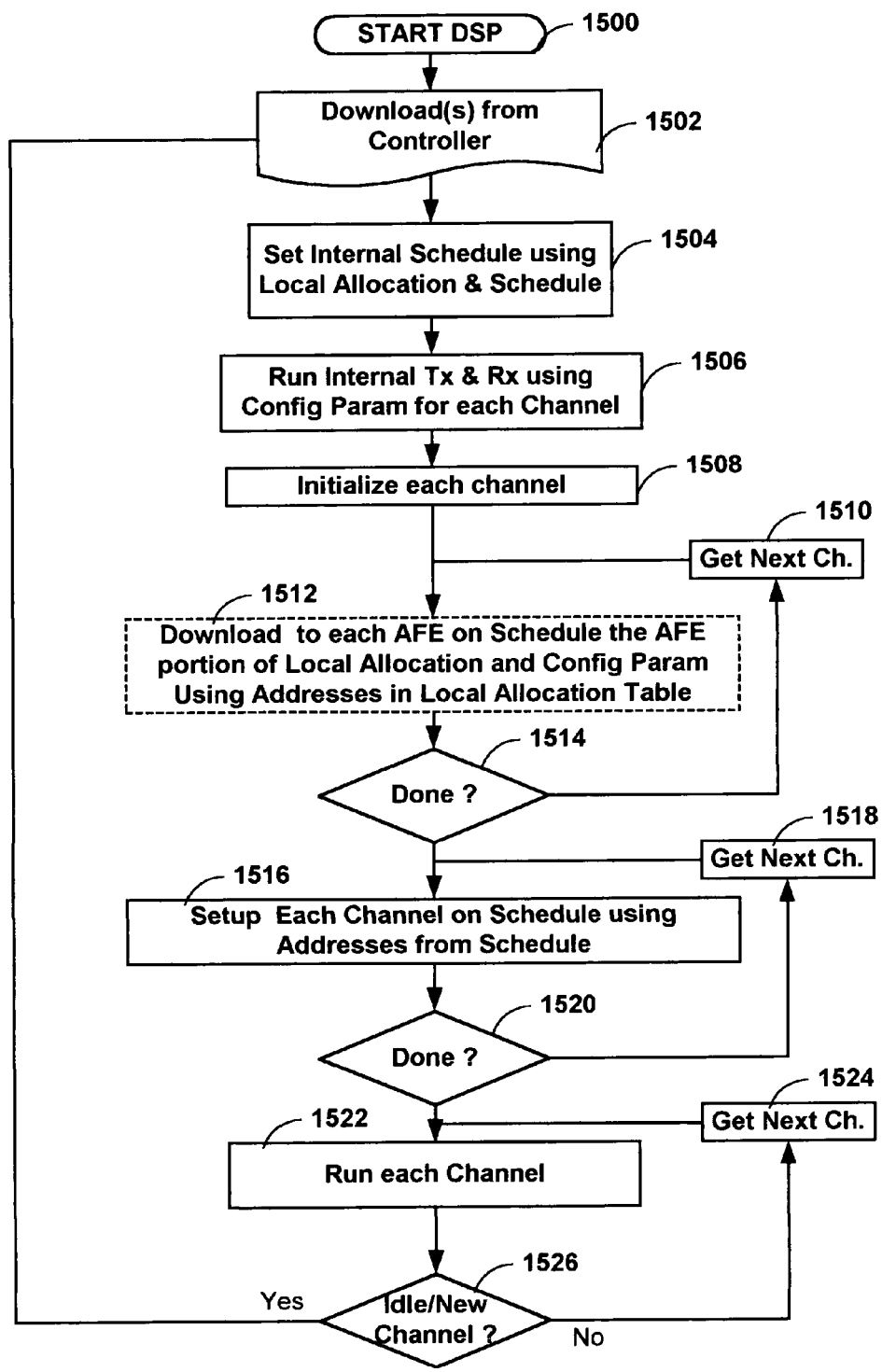
FIG. 15 is a process flow diagram of representative processes executed by the DSP shown in FIG. 4.

FIG. 15 is a process flow diagram of representative processes executed by the DSP shown in FIG. 4. Processing begins at process 1500 subsequent to which downloads 1502 from the DSLAM controller of the Local Allocation and Configuration parameter tables is accomplished. Next in process 1504 the DSP sets an available process time slot for the allocated channel(s) using resident or downloaded parameters associated with the specific protocol, e.g. G.Lite, ADSL, VDSL, required to support the channel. Then Tx & Rx modules are activated in process 1506. Then control is passed to process 1508 to initiate each channel. Control then passes to process 1512 for the download to each AFE of the local allocation and configuration tables relevant to the target AFE. If all channels have been provisioned in a corresponding targeted AFE(s) then decision process 1514 passes control to the setup phase for each channel in process 1516 otherwise control returns through next channel process 1510 for the processing of the next channel. If alternately, provisioning is not complete control returns via process 1518 in which the local allocation and configuration parameter tables for the next channel and its associated target AFE are downloaded.

The setup of each channel occurs in process 1516 using configuration parameters appropriate to whichever xDSL protocol the channel will implement. Until this is complete control is returned by decision process 1520 to next channel process 1518 until all channels have been setup.

Control then passes to process 1522 in which transmit and receive operations are conducted in round robin or other repetitive fashion for each channel. Either a new channel or an idle detection among existing channels will be detected in decision process 1526 in which event control will be passed to process 1502 for the download of new allocation and configuration parameters from the DSLAM controller.

Figure 16:
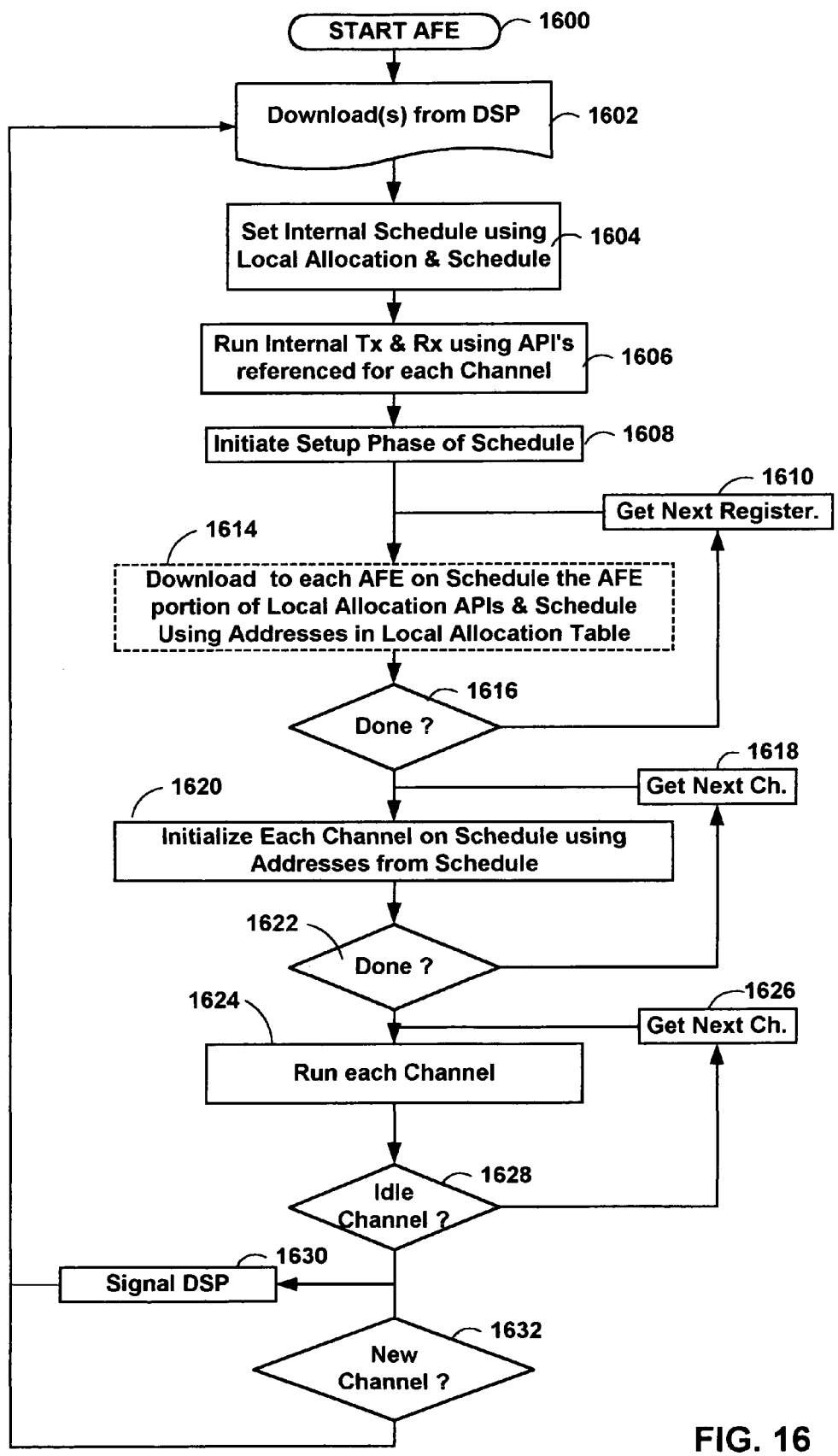
FIG. 16 is a process flow diagram of representative processes executed by each of the AFE's shown in FIG. 4.

FIG. 16 is a process flow diagram of representative processes executed by each of the AFE's shown in FIG. 4. Processing begins at process 1600 subsequent to which downloads 1602 from the DSP of the Local Allocation and Configuration parameter tables is accomplished. Next in process 1604 the AFE sets an available process time slot for the allocated channel(s) using resident or downloaded parameters associated with the specific protocol, e.g. G.Lite, ADSL, VDSL, required to support the channel. Then Tx & Rx modules are activated in process 1606. Then control is passed to process 1608 to setup each channel.

The setup of each channel occurs in process 1620 using configuration parameters appropriate to whichever XDSL protocol each channel will implement as downloaded in processes 1610, 1614, 1616. Until this is complete control is returned by decision process 1622 to next channel process 1618 until all channels have been setup. Control then passes to process 1624 in which transmit and receive operations are conducted in round robin or other repetitive fashion for each channel in processes 1626–1632. Either a new channel or an idle detection among existing channels will be detected in decision processes 1628, 1632 in which event control will be passed to process 1602 for the download of new allocation and configuration parameters from the DSLAM controller.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. An apparatus for xDSL communication of data between a network and subscribers coupled to corresponding subscriber lines, and the apparatus comprising:

at least one analog front end (AFE) coupled to a first set of the subscriber lines supporting a first set of communication channels, and the at least one AFE for converting analog communications from the first set of subscriber lines to corresponding upstream channels of data, and for converting corresponding downstream channels of data into analog communications to the first set of subscriber lines, and the at least one AFE further including:

a plurality of modules coupled to one another to form both a transmit path for packetized conversion of data packets corresponding with downstream channels of data from the network into analog communications and a receive path for converting analog communications from the subscribers to data packets corresponding with upstream channels of data from the subscribers; and buffers between selected ones of the plurality of modules of the transmit path and the receive path for buffering downstream and upstream data packets to allow pipelined processing by selected ones of the plurality of modules on the transmit path and receive path of successive downstream and upstream data packets; and wherein selected successive packets within the transmit path and receive path pipelines of the at least a first AFE, exhibit different XDSL protocols and/or line codes; and wherein further selected ones of the plurality of modules vary the processing of each of the selected successive packets to correspond with the corresponding XDSL protocol and line code; and at least one digital signal processor (DSP) coupled to a network and the at least one DSP for processing downstream channels of data from the network to the subscribers and for processing upstream channels of data from the subscribers to the network.

2. An apparatus for distributed xDSL communication of data between a network and subscribers coupled to corresponding subscriber lines, and the apparatus comprising:

at least one analog front end (AFE) coupled to a first set of the subscriber lines supporting a first set of communication channels and the at least one AFE for converting analog communications from the first set of subscriber lines to corresponding upstream channels of data and for converting corresponding downstream channels of data into analog communications to corresponding ones of the first set of subscriber lines;

a first DSP and a second DSP each coupled to the least one AFE and to the network; and the first and second DSP forming a logical DSP server for the at least one AFE for processing downstream channels of data from the network to the subscribers and for processing upstream channels of data from the subscribers to the network.

3. An apparatus for XDSL communication of data between a network and subscribers coupled to corresponding subscriber lines, and the apparatus comprising:

at least one analog front end (AFE) coupled to at least one of the subscriber lines and the at least one AFE for converting analog communications from the at least one subscriber line to a corresponding upstream channel of data and for converting a corresponding downstream channel of data into analog communications to the at least one of the subscriber lines;

at least one digital signal processor (DSP) coupled to a network and the at least one DSP for processing downstream channels of data from the network to the subscribers and for processing upstream channels of data from the subscribers to the network; and the at least one DSP including:

a plurality of modules coupled to one another to form both a transmit path for packet processing of downstream channels of data from the network and a receive path for packet processing of upstream channels of data from the subscribers to the network; and buffers between selected ones of the plurality of modules of the transmit path and the receive path for buffering downstream and upstream data packets to allow pipelined processing by selected modules on the transmit path and receive path of successive downstream and upstream data packets; and wherein selected successive packets within the transmit path and receive path pipelines respectively of the at least one DSP, exhibit different xDSL protocols and/or line codes; and wherein further selected ones of the plurality of modules vary the processing of each of the selected successive packets to correspond with the corresponding xDSL protocol and line code.

4. An apparatus for XDSL communication of data between a digital signal processor (DSP) and subscribers coupled to corresponding subscriber lines, and the apparatus comprising:

a plurality modules coupled to one another to form both a transmit path and a receive path for an analog front end (AFE), and the transmit path for packetized conversion of downstream data packets corresponding with downstream channels of data from the DSP into analog communications on corresponding subscriber lines and a receive path for converting analog communications from the corresponding subscriber lines to upstream data packets corresponding with upstream channels of data from the subscribers; and buffers between selected ones of the plurality of modules of the transmit path and the receive path for buffering downstream and upstream data packets to allow pipelined processing by selected ones of the plurality of modules on the transmit path and receive path of successive downstream and upstream data packets; and wherein selected successive packets within the transmit path and receive path pipelines of the AFE, exhibit different XDSL protocols and/or line codes; and wherein further selected ones of the plurality of modules vary the processing of each of the selected successive packets to correspond with the corresponding XDSL protocol and line code.

5. An apparatus for XDSL communication of data between subscribers coupled across subscriber lines with at least one analog front end (AFE) and a network, and the apparatus comprising:

a plurality of modules coupled to one another to form both a transmit path and a receive path for a digital signal processor (DSP), and the transmit path for packetized processing of downstream data packets corresponding with downstream channels of data from the network to the at least one AFE and a receive path for processing upstream data packets corresponding with upstream channels of data from the at least one AFE; and buffers between selected ones of the plurality of modules of the transmit path and the receive path for buffering downstream and upstream data packets to allow pipelined processing by selected ones of the plurality of modules on the transmit path and receive path of successive downstream and upstream data packets; and wherein selected successive packets within the transmit path and receive path pipelines respectively of the at least one DSP, exhibit different xDSL protocols and/or line codes; and wherein further selected ones of the plurality of modules vary the processing of each of the selected successive packets to correspond with the corresponding XDSL protocol and line code.

6. A method for XDSL communication of data between a network and subscribers coupled to corresponding subscriber lines, and the method comprising:

coupling a plurality of modules to one another to form both a transmit path and a receive path, and the transmit path for packetized processing of downstream data packets corresponding with downstream channels of data from the network to the subscribers and a receive path for processing upstream data packets corresponding with upstream channels of data from the subscribers;

buffering data packets between selected ones of the plurality of modules of the transmit path and the receive path to allow pipelined processing by selected ones of the plurality of modules on the transmit path and the receive path of successive downstream and upstream data packets; and wherein selected successive packets within the transmit path and receive path pipelines respectively, exhibit different XDSL protocols and/or line codes; and wherein further selected ones of the plurality of modules vary the processing of each of the selected successive packets to correspond with the corresponding XDSL protocol and line code.

7. A means for XDSL communication of data between a network and subscribers coupled to corresponding subscriber lines, and the means comprising:

modular means for forming both a transmit path and a receive path, and the transmit path for packetized processing of downstream data packets corresponding with downstream channels of data from the network to the subscribers and a receive path for processing upstream data packets corresponding with upstream channels of data from the subscribers;

means for buffering data packets between selected ones of the modular means for forming the transmit path and the receive path to allow pipelined processing by selected ones of the modular means on the transmit path and the receive path of successive downstream and upstream data packets; and wherein selected successive packets within the transmit path and receive path pipelines respectively, exhibit different XDSL protocols and/or line codes; and wherein further selected ones of the modular means vary the processing of each of the selected successive packets to correspond with the corresponding xDSL protocol and line code.

* * * * *